(12) United States Patent
Sunaga et al.

(10) Patent No.: US 6,703,459 B1
(45) Date of Patent: Mar. 9, 2004

(54) POLYMERIZATION CATALYSTS FOR UNSATURATED MONOMERS, NOVEL TRANSITION METAL COMPOUNDS, POLYMERIZATION PROCESSES USING SAME, AND COPOLYMERS

(76) Inventors: Tadahiro Sunaga, 1541-1-206, Yabecho, Totsuka-ku, Yokohama-shi, Kanagawa 244-0002 (JP); Hiroshi Kouno, 1-1, Yushudaihigashi, Ichihara-shi, Chiba 299-0124 (JP)

( * ) Notice: Subject to any disclaimer, the term of this patent is extended or adjusted under 35 U.S.C. 154(b) by 0 days.

(21) Appl. No.: 09/701,631
(22) PCT Filed: Apr. 6, 2000
(86) PCT No.: PCT/JP00/02218
§ 371 (c)(1), (2), (4) Date: Dec. 1, 2000
(87) PCT Pub. No.: WO00/59955
PCT Pub. Date: Oct. 12, 2000

(30) Foreign Application Priority Data

Apr. 6, 1999 (JP) .......................................... 11-098542
Jun. 22, 1999 (JP) .......................................... 11-176001

(51) Int. Cl.[7] .............................. C08F 4/44; B01J 31/18
(52) U.S. Cl. ...................... 526/161; 526/164; 526/172; 502/155; 502/167
(58) Field of Search ................................ 526/160, 943, 526/161, 172, 164; 502/121, 152, 155, 156; 505/167

(56) References Cited

U.S. PATENT DOCUMENTS

| | | |
|---|---|---|
| 3,297,667 A | 1/1967 | Von Dohlen et al. |
| 4,290,918 A | 9/1981 | Bayer et al. |
| 5,015,707 A | 5/1991 | Yamamoto et al. |
| 5,744,415 A * | 4/1998 | Wenzel .................. 502/122 |
| 6,255,414 B1 * | 7/2001 | Ittel et al. .................. 526/115 |

FOREIGN PATENT DOCUMENTS

| | | |
|---|---|---|
| JP | 9-241314 | 9/1997 |
| JP | 10-182659 | 7/1998 |
| WO | WO98/45039 | 10/1998 |

OTHER PUBLICATIONS

Chemical Abstracts, vol. 132, No. 7, Feb. 14, 2000, Shen, Qi et al., "Preparation of polyacrylonitrile by using rare earth org. complex and quaternary compound as catalyst", Abstract No. 78986q & CN, 1168893, A.

J. Inorg. Nucl. Chem., 1978, vol. 40, No. 2, pp. 253–256, (Great Britain), James E. McDonald et al., "The Rare Earths–XCI, Lanthanide (III) Complexes of N,N'–Dimethylethylenediamine and N,N,N', N'–Tetramethylethylenediamine".

* cited by examiner

Primary Examiner—Robert D. Harlan

(57) ABSTRACT

This invention relates to polymerization catalysts for unsaturated monomers which are represented by the following general formula [1]:

$$MR^1_k R^2_m R^3_n Q_h \qquad [1]$$

wherein $R^1$ is selected from ligands having at least one nitrogen, sulfur, phosphorus or oxygen atom; $R^2$ is selected from ligands comprising cyclic hydrocarbons having π-electrons, and $R^1$ and $R^2$ may be crosslinked with each other; $R^3$ is selected from ligands comprising a hydrogen atom, alkyl groups, aryl groups, silicon-containing alkyl groups and silicon-containing aryl groups; M is a metal selected from the metals of group III of the periodic table; Q is selected from halogen atoms and electron-donating ligands, where Q may be the same or different if h is more than one; k is an integer of 1 to 4; and m, n and h are each 0 or an integer of 1 to 4.

14 Claims, 7 Drawing Sheets

POLYMERIZATION CATALYSTS FOR UNSATURATED MONOMERS, NOVEL TRANSITION METAL COMPOUNDS, POLYMERIZATION PROCESSES USING SAME, AND COPOLYMERS

TECHNICAL FIELD

This invention relates to polymerization catalysts for unsaturated monomers, novel transition metal compounds, polymerization processes using the same, and copolymers having a linkage formed by the migration of the active hydrogen of an unsaturated monomer. More particularly, it relates to polymerization catalysts for unsaturated monomers comprising organic transition metal complexes having a specific structure, processes for polymerizing unsaturated monomers by using such polymerization catalysts, and copolymers having a linkage formed by the migration of the active hydrogen of an unsaturated monomer.

BACKGROUND ART

A large number of catalysts for the polymerization of unsaturated monomers have been reported by many investigators for long time. These catalysts are used by selecting an appropriate one so as to suit the type of the unsaturated monomer to be polymerized. According to the mechanism of polymerization, they are broadly classified into cationic polymerization catalysts, coordinated anionic polymerization catalysts and anionic polymerization catalysts.

The cationic polymerization of a-olefins, styrene, vinyl ether, vinyl sulfide and the like by using cationic polymerization catalysts such as proton acids (e.g., sulfuric acid and trifluoroacetic acid) and Lewis acids (e.g., aluminum chloride and titanium tetrachloride) is generally known. Moreover, as catalyst systems comprising a combination of an alkyl compound of a metal of group I, II or XIII of the periodic table and a compound of a transition metal of group IV to X are known as Ziegler-Natta catalysts for the coordinated anionic polymerization of ethylene, α-olefins, dienes and the like [John Boor, Jr., Ziegler-Natta Catalysts and Polymerizations, Academic Press, Inc. (1979)]. Furthermore, polymerization catalysts for olefins comprising organic transition metal complexes containing a transition metal of group IV, VIII or X have recently been reported by W. Kaminsky (Angew. Chem., 1985, 97, 507) and M. Brookhart (J. Am. Chem. Soc., 1995, 117, 6414; 1998, 120, 4049). These organic transition metal complexes are catalyst systems in which methylaluminoxane is used as a Lewis acid co-catalyst.

Furthermore, polymerization catalysts for olefins comprising organic transition metal complexes containing a transition metal of group IV, VIII or X have recently been reported by W. Kaminsky (Angew. Chem., 1985, 97, 507) and M. Brookhart (J. Am. Chem. Soc., 1995, 117, 6414; 1998, 120, 4049). These organic transition metal complexes are catalyst systems in which methylaluminoxane is used as a Lewis acid co-catalyst.

Furthermore, it is also known that basic catalysts such as butyllithium, naphthalenesodium and butoxysodium catalyze the anionic polymerization of unsaturated monomers such as methacrylic esters and so on having an electron-withdrawing polar group and other unsaturated monomers such as α-olefins, dienes and styrene.

With respect to the hydrogen migration polymerization of acrylamide, a process for synthesizing poly-β-alanine (or Nylon-3) from acrylamide with the aid of a basic catalyst such as tert-butoxysodium was first reported by Matlack (U.S. Pat. No. 2,672,480) and Breslow (J. Am. Chem. Soc., 1957, 79, 3760). Since then, many improvements in basic catalysts and polymerization processes have been made. As such polymerization catalysts, alkali metal alcoholates such as tert-butoxypotassium (Japanese Patent Publication Nos. 27616/'68, 21739/'71 and 37359/'73), alkyl alkali metals such as butyllithium (U. Morgenstern et al., Makromol. Chem., 1992, 193, 2561), and Grignard reagents such as ethylmagnesium bromide (Ogata, J. Polymer Sci., 1960, 147, 271) have been reported.

Moreover, recently, the polymerization of methyl methacrylate by using a lanthanide-based metallocene compound having a ligand comprising a cyclic hydrocarbon having π-electrons (e.g., a pentamethylcyclopentadienyl ligand) has been reported by Yasuda et al. (Macromolecules, 1993, 26, 7134), and the polymerization of styrene, or the copolymerization of styrene and caprolactone, with the aid of a lanthanide-based organometallic complex having an amide ligand has been reported (Japanese Patent Laid-Open No. 241314/'97). Furthermore, the polymerization of acrylonitrile with the aid of a cobalt-phosphine complex catalyst has been reported (K. Tsuchihara et al., Chemistry Letters, 1999, 9, 891). In addition, the use of an yttrium complex catalyst containing crosslinked cyclopentadiene and butylamide for the polymerization of ethylene or styrene (J. Okuda et al., Organometallics, 2000, 19, 228) and for the polymerization of acrylonitrile or butyl acrylate (J. Okuda et al., Polymer Preprints, 1999, 1, 372) have also been reported. On the other hand, these complex catalysts have low polymerization activity, particularly for acrylonitrile, and the molecular weights of the resulting polymers are low. Moreover, since they have no ability to induce copolymerization, no copolymerization occurs even between acrylonitrile and styrene.

However, for the anionic polymerization of unsaturated monomers, only organometallic compounds based on an alkali metal or alkaline earth metal are known as basic catalysts for polymerizing a relatively wide range of unsaturated monomers such as acrylamide, acrylonitrile, methacrylic esters, styrene and dienes, and only lanthanide-based metallocene compounds and limited organometallic complexes are known as catalysts for the polymerization of methacrylic esters. With respect to other metals, there has been found no organic transition metal complex catalyst that has polymerization catalyst characteristics permitting the polymerization of not only monomers containing a functional group with high polarity (e.g, acrylamide and acrylonitrile) but also monomers containing a functional group with medium polarity (e.g, methacrylic esters) and monomers having low polarity (e.g., styrene), and also has the ability to copolymerize these monomers. Moreover, conventional basic catalysts based on an alkali metal or alkaline earth metal and conventional limited organometallic complexes tend to have low polymerization activity and low polymer yield, and the molecular weights of the resulting polymers are low in many cases.

In order to solve the above-described problems, the present inventors made intensive investigations on polymerization catalysts for unsaturated monomers, polymerization processes using them, and copolymers having a polyamide linkage, and have now completed the present invention.

DISCLOSURE OF THE INVENTION

That is, the present invention relates to polymerization catalysts for unsaturated monomers which are represented by the following general formula [1]:

$$MR^1{}_kR^2{}_mR^3{}_nQ_h \quad [1]$$

wherein $R^1$ is selected from ligands having at least one nitrogen, sulfur, phosphorus or oxygen atom; $R^2$ is selected from ligands comprising cyclic hydrocarbons having π-electrons, and $R^1$ and $R^2$ may be crosslinked with each other; $R^3$ is selected from ligands comprising a hydrogen atom, alkyl groups, aryl groups, silicon-containing alkyl groups and silicon-containing aryl groups; M is a metal selected from the metals of group III of the periodic table; Q is selected from halogen atoms and electron-donating ligands, where Q may be the same or different if h is more than one; k is an integer of 1 to 4; and m, n and h are each 0 or an integer of 1 to 4. The present invention also relates to novel transition metal compound of the general formula [1] in which $R^1$ is a ligand represented by the following general formula [2], [3] or [4]:

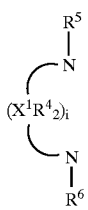

[2]

wherein $R^4$ is selected from a hydrogen atom, alkyl groups and aryl groups; $R^5$ and $R^6$ are each selected from alkyl groups, aryl groups, silicon-containing alkyl groups and silicon-containing aryl groups; $X^1$ is selected from a carbon atom and a silicon atom, where $X^1$ may be the same or different if $X^1$ is more than one and i is an integer of 1 to 6.

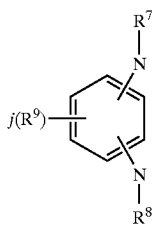

[3]

wherein $R^7$, $R^8$ and $R^9$ are each selected from alkyl groups, aryl groups, silicon-containing alkyl groups and silicon-containing aryl groups, where $R^7$, $R^8$ and $R^9$ may be the same or different if j is more than one; and j is 0 or an integer of 1 to 4.

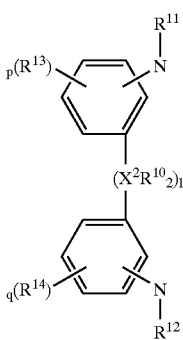

[4]

wherein $R^{10}$ is selected from a hydrogen atom, alkyl groups and aryl groups; $R^{11}$, $R^{12}$, $R^{13}$ and $R^{14}$ are each selected from alkyl groups, aryl groups, silicon-containing alkyl groups and silicon-containing aryl groups; $X^2$ is selected from a carbon atom and a silicon atom, where $X^2$ may be the same or different if l, p and q is more than one; and l, p and q are each 0 or an integer of 1 to 4.

Moreover, the present invention also relates to a polymerization process comprising the step of effecting the homopolymerization or copolymerization of one or more unsaturated monomers by using a polymerization catalyst of the general formula [1] in which $R^1$ is a ligand represented by the general formula [2], [3] or [4]. Furthermore, the present invention also relates to a polymerization process comprising the step of effecting the homopolymerization of an unsaturated monomer having a cyano group, or the copolymerization of unsaturated monomers including at least one unsaturated monomer having a cyano group, with the aid of a polymerization catalyst of the general formula [1] in which m is 0, and to a polymerization process comprising the step of effecting the homopolymerization of an unsaturated monomer having an amide group, or the copolymerization of unsaturated monomers including at least one unsaturated monomer having an amide group, with the aid of a polymerization catalyst of the general formula [1].

Furthermore, the present invention also relates to copolymers formed by the copolymerization of unsaturated monomers including at least one unsaturated monomer having active hydrogen, and characterized by having a linkage formed by the migration of the active hydrogen of the unsaturated monomer.

BEST MODE FOR CARRYING OUT THE INVENTION

Figure 1:
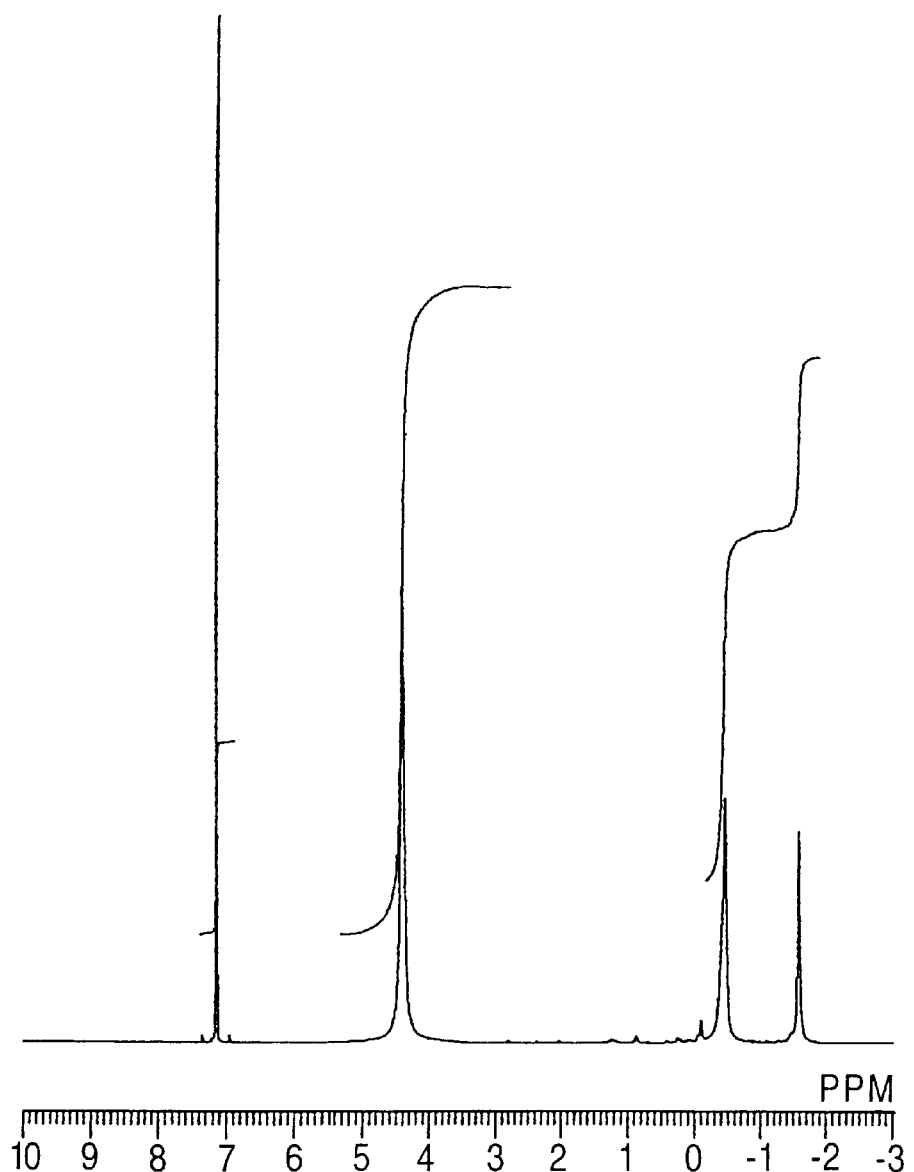
FIG. 1 shows the $^1$H-NMR spectrum of a deep-purple solid obtained in Example 1.

In the present invention, $R^1$ in the general formula [1] is selected from ligands having at least one nitrogen, sulfur, phosphorus or oxygen atom. The ligands containing nitrogen include amides, nitrogen-containing heterocyclic compounds, imines and the like. The amides include mono- or disubstituted amides having one or two substituent groups selected from alkyl groups of 1 to 20 carbon atoms, such as methyl, ethyl, propyl, isopropyl, 2-methylpropyl, tert-butyl and cyclohexyl; halogenated alkyl groups of 1 to 20 carbon atoms, such as trifluoromethyl and tribromomethyl; aryl groups of 6 to 20 carbon atoms, such as phenyl, benzyl, naphthyl, methylphenyl, 2,6-dimethylphenyl and 2,6-diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl, as well as crosslinked amides having two or more nitrogen atoms.

Specific examples of the amides having two or more nitrogen atoms crosslinked with each other, which are represented by $R^1$ in the general formula [1], include ligands represented by the following general formula [2], [3] and [4].

[2]

wherein $R^4$ is selected from a hydrogen atom, alkyl groups and aryl groups; $R^5$ and $R^6$ are each selected from alkyl groups, aryl groups, silicon-containing alkyl groups and silicon-containing aryl groups; $X^1$ is selected from a carbon atom and a silicon atom, where $X^1$ may be the same or different if $X^1$ is more than one and i is an integer of 1 to 6.

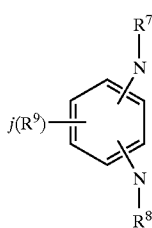

[3]

wherein $R^7$, $R^8$ and $R^9$ are each selected from alkyl groups, aryl groups, silicon-containing alkyl groups and silicon-containing aryl groups, where $R^7$, $R^8$ and $R^9$ may be the same or different if j is more than one; and j is 0 or an integer of 1 to 4.

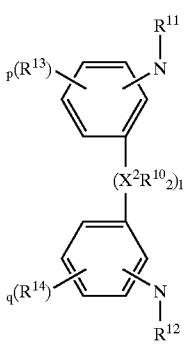

[4]

wherein $R^{10}$ is selected from a hydrogen atom, alkyl groups and aryl groups; $R^{11}$, $R^{12}$, $R^{13}$ and $R^{14}$ are each selected from alkyl groups, aryl groups, silicon-containing alkyl groups and silicon-containing aryl groups; $X^2$ is selected from a carbon atom and a silicon atom, where $X^2$ may be the same or different if l, p and q is more than one; and l, p and q are each 0 or an integer of 1 to 4.

The radicals which can be represented by $R^4$ in the general formula [2] include, for example, a hydrogen atom, alkyl groups of 1 to 10 carbon atoms (e.g., methyl, ethyl and tert-butyl), and aryl groups of 6 to 20 carbon atoms (e.g., phenyl). $X^1$ is selected from a carbon atom and a silicon atom, and i is an integer of 1 to 6. When i is two or greater, $X^1$ may be a combination of carbon and silicon atoms. The radicals which can be represented by $R^5$ and $R^6$ in the general formula [2], $R^7$, $R^8$ and $R^9$ in the general formula [3], and $R^{11}$, $R^{12}$, $R^{13}$ and $R^{14}$ in the general formula [4] include, for example, alkyl groups of 1 to 20 carbon atoms, such as methyl, ethyl, isopropyl, 2-methylpropyl, tert-butyl and cyclohexyl; aryl groups of 6 to 20 carbon atoms, such as phenyl, benzo, benzyl, naphthyl, methylphenyl, 2,6-dimethylphenyl and 2,6-diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl. These radicals may be the same or different if they are more than one.

Moreover, the radicals which can be represented by $R^{10}$ in the general formula [4] include, for example, a hydrogen atom, alkyl groups of 1 to 20 carbon atoms (e.g., methyl, ethyl and tert-butyl), and aryl groups of 6 to 20 carbon atoms (e.g., phenyl). When two or more radicals are represented by $R^{10}$, they may be the same or different. When i is 1 or 2 or greater, $X^2$ may be a combination of carbon and silicon atoms.

Specific examples of $R^1$ represented by the general formula [2] include N,N'-di(2,6-diisopropylphenyl)propylene-1,3-diamide, N,N'-di(2,6-diisopropylphenyl)ethylene-1,2-diamide, N,N'-di(trimethylsilyl)propylene-1,3-diamide and N,N'-di(tert-butyl)propylene-1,3-diamide. Specific examples of $R^1$ represented by the general formula [3] include N,N'-di(trimethylsilyl)-1,2-phenylenediamide, N,N'-di(tert-butyl)-1,2-phenylenediamide, N,N'-di(2,6-diisopropylphenyl)-1,2-phenylenediamide, N,N'-di(trimethylsilyl)-4,5-dimethyl-1,2-phenylenediamide and N,N'-di(trimethylsilyl)-2,3-naphthalenediamide. Specific examples of $R^1$ represented by the general formula [4] include N,N'-di(trimethylsilyl)-1,1'-binaphthalene-2,2'-diamide, N,N'-di(tert-butyl)-1,1'-binaphthalene-2,2'-diamide, N,N'-di(trimethylsilyl)-1,1'-biphenylene-2,2'-diamide, N,N'-di(trimethylsilyl)-3,3'-dimethyl-1,1'-biphenylene-2,2'-diamide, N,N'-di(trimethylsilyl)-6,6'-dimethyl-1,1'-biphenylene-2,2'-diamide and N,N'-di(trimethylsilyl)-1,1'-ethylenebiphenyl-2,2'-diamide.

The nitrogen-containing heterocyclic compounds include pyridine, lutidine, quinoline, 2,2'-bipyridine, 1,10-phenathroline and like compounds; pyridine, lutidine, quinoline, 2,2'-bipyridine, 1,10-phenathroline and like compounds having one or more substituent groups comprising hydrocarbon radicals (e.g., alkyl groups) or polar radicals (e.g., an acetoxy group); and crosslinked nitrogen-containing heterocyclic compounds having two or more nitrogen atoms.

The imines may comprise alkylidene groups of 1 to 20 carbon atoms, such as methylidene, ethylidene, propylidene, isopropylidene, 2-methylpropylidene and cyclohexylidene, and may further be substituted by a group selected from halogenated alkyl groups of 1 to 20 carbon atoms, such as trifluoromethyl and tribromomethyl; aryl groups of 6 to 20 carbon atoms, such as phenyl, benzyl, naphthyl, methylphenyl, 2,6-dimethylphenyl and 2,6- diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl. The imines may also comprise crosslinked imines having two or more nitrogen atoms. Furthermore, two or more of the aforesaid amides, nitrogen-containing heterocyclic compounds and imines may be used in combination.

The sulfur-containing ligands include sulfido, sulfinyl, sulfonyl and the like. They also include mono- or disubstituted sulfido, sulfinyl and sulfonyl substituted by one or two groups selected from alkyl groups of 1 to 20 carbon atoms, such as methyl, ethyl, propyl, isopropyl, 2-methylpropyl, tert-butyl and cyclohexyl; halogenated alkyl groups of 1 to 20 carbon atoms, such as trifluoromethyl and tribromomethyl; aryl groups of 6 to 20 carbon atoms, such as phenyl, benzyl, naphthyl, methylphenyl, 2,6-dimethylphenyl and 2,6-diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis (trimethylsilyl)methyl and dimethylphenylsilylmethyl, as well as crosslinked sulfido, sulfinyl and sulfonyl having two or more sulfur atoms.

The phosphorus-containing ligands include phosphine. They also include mono- to trisubstituted phosphines substituted by one to three groups selected from alkyl groups of 1 to 20 carbon atoms, such as methyl, ethyl, propyl, isopropyl, 2-methylpropyl, tert-butyl and cyclohexyl; halogenated alkyl groups of 1 to 20 carbon atoms, such as trifluoromethyl and tribromomethyl; aryl groups of 6 to 20 carbon atoms, such as phenyl, benzyl, naphthyl, methylphenyl, 2,6-dimethylphenyl and 2,6-diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl, as well as crosslinked phosphine having two or more phosphorus atoms.

The oxygen-containing ligands include oxy and carbonyl. They also include oxy and carbonyl substituted by a group selected from alkyl groups of 1 to 20 carbon atoms, such as methyl, ethyl, propyl, isopropyl, 2-methylpropyl, tert-butyl and cyclohexyl; halogenated alkyl groups of 1 to 20 carbon atoms, such as trifluoromethyl and tribromomethyl; aryl groups of 6 to 20 carbon atoms, such as phenyl, benzyl, naphthyl, methylphenyl, 2,6-dimethylphenyl and 2,6-diisopropylphenyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl, as well as crosslinked oxy and carbonyl having two or more oxygen atoms. The groups represented by $R^1$ may be present in any number ranging from 1 to 4, and when two or more groups are represented by $R^1$, they may be the same or different.

In the present invention, $R^2$ in the general formula [1] is selected from ligands derived from cyclic hydrocarbons of 5 to 20 carbon atoms having π-electrons. Specific examples thereof include cyclopentadienyl, indenyl and fluorenyl groups. Specific examples of substituted derivatives include cyclopentadienyl, indenyl and fluorenyl groups having one to five substituent groups selected from alkyl groups of 1 to 20 carbon atoms, such as methyl, ethyl, propyl, isopropyl, tert-butyl and cyclohexyl; aryl groups of 6 to 20 carbon atoms, such as phenyl, benzyl and naphthyl; and silicon-containing alkyl groups of 1 to 20 carbon atoms and silicon-containing aryl groups of 6 to 20 carbon atoms, such as trimethylsilyl, dimethylsilyl, dimethylethylsilyl, triethylsilyl, cyclohexyldimethylsilyl, tert-butyldimethylsilyl, dimethylphenylsilyl, trimethylsilylmethyl, bis(trimethylsilyl)methyl and dimethylphenylsilylmethyl.

The ligands represented by $R^2$ may be present in any number ranging from 0 to 4, and when two or more radicals are represented by $R^2$, they may be the same or different. Moreover, $R^1$ and $R^2$ may be crosslinked with each other. Specific examples of crosslinked $R^1$ and $R^2$ include N-tert-butyl-tetramethylcyclopentadienyldimethylsilyleneamide, N-trimethylsilyl-tetramethylcyclopentadienyldimethylsilyleneamide, N-tert-butyl-indenyldimethylsilyleneamide and tetramethylcyclopentadienylethylenedimethylphosphine.

In the present invention, $R^3$ in the general formula [1] is selected from a hydrogen atom, alkyl groups of 1 to 20 carbon atoms, aryl groups of 6 to 20 carbon atoms, silicon-containing alkyl groups of 1 to 20 carbon atoms, and silicon-containing aryl groups of 6 to 20 carbon atoms. Specific examples of the alkyl groups include methyl, ethyl, propyl, isopropyl, 2-methylpropyl, tert-butyl and cyclohexyl. Specific examples of the aryl groups include phenyl, benzyl, naphthyl, methylphenyl, 2,6-dimethylphenyl and 2,6-diisopropylmethylphenyl. Specific examples of the silicon-containing alkyl groups include trimethylsilyl, dimethylsilyl, dimethylethylsilyl, triethylsilyl, cyclohexyldimethylsilyl, tert-butyldimethylsilyl, trimethylsilylmethyl and bis(trimethylsilyl)methyl. The ligands represented by $R^3$ may be present in any number ranging from 0 to 4, and when two or more radicals are represented by $R^3$, they may be the same or different.

In the present invention, M in the general formula [1] is a metal selected from the metals of group III of the periodic table. When expressed by symbols of elements, the metals which can be represented by M include Sc, Y, lanthanide series transition metals (i.e., La, Ce, Pr, Nd, Pm, Sm, Eu, Gd, Tb, Dy, Ho, Er, Tm, Yb and Lu) and actinide series transition metals (i.e., Ac, Th, Pa, U, Np, Pu, Am, Cm, Bk, Cf, Es, Fm, Md, No and Lr).

Moreover, Q is independently selected from halogen atoms and electron-donating ligands. Specific examples of the halogen atoms include fluorine, chlorine, bromine and iodine atoms. Specific examples of the electron-donating ligands include ethers such as tetrahydrofuran (hereinafter referred to as THF), diethyl ether, dioxane and 1,2-dimethoxyethane; phosphines such as trimethylphosphine; pyridines such as pyridine and lutidine; and amines such as triethylamine. When two or more ligands are represented by Q, they may be the same or different.

Specific examples of the polymerization catalyst for unsaturated monomers of the general formula [I] in accordance with the present invention are shown below. However, it is to be understood that the present invention is not limited thereto.

For example, where samarium is selected as the metal represented by M, useful polymerization catalysts comprising organosamarium complexes include [TMS$_2$N]$_2$Sm(THF)$_2$, [TMS$_2$N]$_2$Sm[CH(TMS)$_2$](THF), [TMS$_2$N]$_2$Sm[CH$_2$(TMS)](THF), [TMS$_2$N]$_3$Sm(THF), [TMS$_2$N]$_2$SmCl(THF), [TMS$_2$N]$_2$SmH(THF), [TMS$_2$N]$_2$SmMe(THF), [2,6-iPr$_2$C$_6$H$_3$(TMS)N]$_2$Sm(THF)$_2$, [2,6-iPr$_2$C$_6$H$_3$(TMS)N]$_2$Sm[CH(TMS)$_2$](THF), [2,6-iPr$_2$C$_6$H$_3$(TMS)N]$_2$Sm[CH$_2$(TMS)](THF), [2,6-iPr$_2$C$_6$H$_3$(TMS)N]$_2$Sm[TMS$_2$N](THF), [2,6-iPr$_2$C$_6$H$_3$(TMS)N]$_2$SmCl(THF), [2,6-iPr$_2$C$_6$H$_3$(TMS)N]$_2$SmH(THF), [2,6-iPr$_2$C$_6$H$_3$(TMS)N]$_2$SmMe(THF), [iPr$_2$N]$_2$Sm(THF)$_2$, [iPr$_2$N]$_2$Sm[CH(TMS)$_2$](THF), [iPr$_2$N]$_2$Sm[CH$_2$(TMS)](THF), [iPr$_2$N]$_3$Sm(THF), [iPr$_2$N]$_2$SmCl(THF), [iPr$_2$N]$_2$SmH(THF), [iPr$_2$N]$_2$SmMe(THF); and [N,N'-(TMS)$_2$-BinN]Sm(THF)$_2$, [N,N'-(TMS)$_2$-BinN]Sm[CH(TMS)$_2$](THF), [N,N'-(TMS)$_2$-BinN]Sm[CH$_2$(TMS)](THF), [N,N'-(TMS)$_2$-BinN]Sm[TMS$_2$N](THF), [N,N'-(TMS)$_2$-BinN]$_2$SmCl(THF), [N,N'-(TMS)$_2$-BinN]SmH(THF), [N,N'-(TMS)$_2$-BinN]SmMe(THF), [N,N'-(TMS)$_2$-BiPN]Sm( THF)$_2$, [N,N'-(TMS)$_2$-BipN]Sm[CH(TMS)$_2$](THF), [N,N'-(TMS)$_2$-BipN]Sm[CH$_2$(TMS)](THF), [N,N'-(TMS)$_2$-BipN]Sm[TMS$_2$N](THF), [N,N'-(TMS)$_2$-BipN]SmCl(THF), [N,N'-(TMS)$_2$-BipN]SmH(THF), [N,N'-(TMS)$_2$-BipN]SmMe(THF), [N,N'-(TMS)$_2$-1,1'-C$_2$H$_4$-BipN]Sm(THF)$_2$, [N,N'-(TMS)-1,1'-C$_2$H$_4$-BipN]Sm[CH(TMS)$_2$](THF), [N,N'-(TMS)$_2$-1,1'-C$_2$H$_4$-BipN]Sm[CH$_2$(TMS)](THF),[N,N'-(TMS)$_2$-1,1'-C$_2$H$_4$-BipN]Sm[TMS$_2$N](THF), [N,N'-(TMS)$_2$-BipN]SmCl(THF), [N,N'-(TMS)$_2$-1,1'-C$_2$H$_4$-BipN]SmH(THF), [N,N'-(TMS)$_2$-1,1'-C$_2$H$_4$-BipN]SmMe(THF), [N,N'-(TMS)-DmBipN]Sm(THF)$_2$, [N,N'-(TMS)$_2$-DmBipN]Sm(CH(TMS)$_2$](THF), [N,N'-(TMS)$_2$-DmBipN]Sm[CH$_2$(TMS)](THF), [N,N'-(TMS)$_2$-DmBipN]Sm[TMS$_2$N](THF), [N,N'-(TMS)$_2$-DmBipN]SmCl(THF), [N,N'-(TMS)$_2$-DmBipN]SmH(THF), [N,N'-(TMS)$_2$-DmBipN]SmMe(THF); and [1,3-(2,6-iPr$_2$C$_6$H$_3$N)$_2$C$_3$H$_6$]Sm(THF)$_2$, [1,3-(2,6-iPr$_2$C$_6$H$_3$N)$_2$C$_3$H$_6$]Sm[CH(TMS)$_2$](THF), [1,3-(2,6-iPr$_2$C$_6$H$_3$N)$_2$C$_3$H$_6$]Sm[CH$_2$(TMS)](THF), [1,3-(2,6-iPr$_2$C$_6$H$_3$N)$_2$C$_3$H$_6$]Sm[TMS$_2$N](THF), [1,3-(2,6-iPr$_2$C$_6$H$_3$N)$_2$C$_3$H$_6$]SmCl(THF), [1,3-(2,6-iPr$_2$C$_6$H$_3$N)$_2$C$_3$H$_6$]SmH(THF), [1,3-(2,6-iPr$_2$C$_6$H$_3$N)$_2$C$_3$H$_6$]SmMe(THF), [1,2-(2,6-iPr$_2$C$_6$H$_3$N)$_2$C$_2$H$_4$]Sm(THF)$_2$, [1,2-(2,6-iPr$_2$C$_6$H$_3$N)$_2$C$_2$H$_4$]Sm[CH(TMS)$_2$)](THF), [1,2-(2,6-iPr$_2$C$_6$H$_3$N)$_2$C$_2$H$_4$]Sm[CH$_2$(TMS)](THF), [1,2-(2,6-iPr$_2$C$_6$H$_3$N)$_2$C$_2$H$_4$]Sm[TMS$_2$N](THF), [1,2-(2,6-iPr$_2$C$_6$H$_3$N)$_2$C$_2$H$_4$]SmCl(THF), [1,2-(2,6-iPr$_2$C$_6$H$_3$N)$_2$C$_2$H$_4$]SmH(THF), [1,2-(2,6-iPr$_2$C$_6$H$_3$N)$_2$C$_2$H$_4$]SmMe(THF), [1,3-(tBUN)$_2$C$_3$H$_6$]Sm(THF)$_2$, [1,3-(tBuN)$_2$C$_3$H$_6$]Sm[CH(TMS)$_2$](THF), [1,3-(tBuN)$_2$C$_3$H$_6$]Sm[CH$_2$(TMS)](THF), [1,3-(tBuN)$_2$C$_3$H$_6$]Sm[TMS$_2$N](THF), [1,3-(tBUN)$_2$C$_3$H$_6$]SmCl(THF), [1,3-(tBUN)$_2$C$_3$H$_6$]SmH(THF), [1,3-(tBuN)$_2$C$_3$H$_6$]SmMe(THF); and [N,N'-(TMS)$_2$-PldN]Sm(THF)$_2$, [N,N'-(TMS)$_2$-PldN]Sm[CH(TMS)$_2$](THF), [N,N'-(TMS)$_2$-PldN]Sm[CH$_2$(TMS)](THF), [N,N'-(TMS)$_2$-PldN]Sm[TMS$_2$N](THF), [N,N'-(TMS)$_2$-PldN]SmCl(THF), [N,N'-(TMS)$_2$-PldN]SmMe(THF), [N,N'-(TMS)$_2$-DmPldN]Sm(THF)2, [N,N'-(TMS)$_2$-DmPldN]Sm[CH(TMS)$_2$](THF), [N,N'-(TMS)$_2$-DmPldN]Sm[CH$_2$(TMS)](THF), [N,N'-(TMS)$_2$-DmPldN]Sm[TMS$_2$N](THF), [N,N'-(TMS)$_2$-DMPldN]SmCl(THF), [N,N'-(TMS)$_2$-DmPldN]SmH(THF), [N,N'-(TMS)$_2$-DmPldN]SmMe(THF), [N,N'-(TMS)$_2$-NldN]Sm(THF)$_2$, [N,N'-(TMS)$_2$-NldN]Sm[CH(TMS)$_2$](THF), [N,N'-(TMS)$_2$-NldN]Sm[CH$_2$(TMS)](THF), [N,N'-(TMS)$_2$-NldN]Sm[TMS$_2$N](THF), [N,N'-(TMS)$_2$-NldN]SmCl(THF), [N,N'-(TMS)$_2$-NldN]SmH(THF), [N,N'-(TMS)$_2$-NldN]SmMe(THF); and (TMS$_2$N)(Cp)Sm(THF)$_2$, (TMS$_2$N)(Cp)Sm[CH(TMS)$_2$](THF), (TMS$_2$N)(Cp)Sm[CH$_2$(TMS)](THF), (TMS$_2$N)(Cp)Sm[TMS$_2$N](THF), (TMS$_2$N)(Cp)SmCl(THF), (TMS$_2$N)(Cp)SmH(THF), (TMS$_2$N)(Cp)SmMe(THF), (TMS$_2$N)(Cp*)Sm[CH(TMS)$_2$](THF), (TMS$_2$N)(Cp*)Sm[CH$_2$(TMS)](THF), (TMS$_2$N)(Cp*)Sm[TMS$_2$N](THF), (TMS$_2$N)(Cp*)SmCl(THF), (TMS$_2$N)(Cp*)SmH(THF), (TMS$_2$N)(Cp*)SmMe(THF), (TMS$_2$N)(ind)Sm(THF)$_2$, (TMS$_2$N)(ind)Sm(THF)$_2$, (TMS$_2$N)(ind)Sm[CH(TMS)$_2$](THF), (TMS$_2$N)(ind)Sm[CH$_2$(TMS)](THF), (TMS$_2$N)(ind)Sm[TMS$_2$N](THF), (TMS$_2$N)(ind)SmCl(THF), (TMS$_2$N)(ind)SmH(THF), (TMS$_2$N)(ind)SmMe(THF); and [N-(TMS)-SiMe$_2$-(Me$_4$CP)]Sm(THF)$_2$, [N-(TMS)-SiMe$_2$-(Me$_4$Cp)]Sm[CH(TMS)](THF), [N-(TMS)-SiMe$_2$-(Me$_4$Cp)]Sm[CH$_2$(TMS)](THF),[N-(TMS)-SiMe$_2$-(Me$_4$Cp)]SmCl(THF), [N-(TMS)-SiMe$_2$-(Me$_4$Cp)]SmH(THF), [N-(TMS)-SiMe$_2$-(Me$_4$Cp)]SmMe(THF), [N-(tBu)-SiMe$_2$-(Me$_4$Cp)]Sm(THF)$_2$, [N-(tBu)-SiMe$_2$-(Me$_4$CP)]Sm[CH(TMS)$_2$](THF), [N-(tBu)-SiMe$_2$-(Me$_4$CP)]Sm[CH$_2$(TMS)](THF), ([N-(tBu)-SiMe$_2$-(Me$_4$Cp)])Sm[TMS$_2$N](THF), [N-(tBu)-SiMe$_2$-(Me$_4$Cp)]SmCl(THF), [N-(tBu)-SiMe$_2$-(Me$_4$Cp)]SmH(THF), [N-(TMS)-SiMe$_2$-(Me$_4$Cp)]SmMe(THF); and (Bprd)Sm(THF)$_2$, (Bprd)Sm[CH(TMS)$_2$](THF), (Bprd)Sm[CH$_2$(TMS)](THF), (Bprd)Sm[TMS$_2$N](THF), (Bprd)SmCl(THF), (Bprd)SmH(THF), (Bprd)SmMe(THF); and (2,6-iPr$_2$C$_6$H$_3$N═C(Me)$_2$Sm(THF)$_2$, [2,6-iPr$_2$C$_6$H$_3$N═C(Me)]$_2$Sm[CH(TMS)$_2$](THF), [2,6-iPr$_2$C$_6$H$_3$N═C(Me)]$_2$Sm[CH$_2$(TMS)](THF), [2,6-iPr$_2$C$_6$H$_3$N═C(Me)]$_2$Sm[TMS$_2$N](THF), [2,6-iPr$_2$C$_6$H$_3$N═C(Me)]$_2$SmCl(THF), [2,6-iPr$_2$C$_6$H$_3$N═C(Me)]$_2$SmH(THF), [2,6-iPr$_2$C$_6$H$_3$N═C(Me)]$_2$SmMe[CH(TMS)$_2$](THF); and (tpp)$_2$Sm(THF)$_2$, (tpp)$_2$Sm(THF)$_2$, (tpp)$_2$Sm[CH(TMS)$_2$](THF), (tPP)$_2$Sm[CH$_2$(TMS)](THF), (tpp)$_2$Sm[TMS$_2$N](THF), (tpp)$_2$SmCl(THF), (tpp)$_2$SmH(THF), (tpp)$_2$SnMe(THF), dpppSm(THF)$_2$, dpppSm(THF)$_2$, dpppSm[CH(TMS)$_2$](THF), dpppSm[CH$_2$(TMS)](THF), dpppSm[TMS$_2$N](THF), dpppSmCl(THF), dpppSmH(THF), dpppSmMe(THF); and (PhO)$_2$Sm(THF)$_2$, (PhO)$_2$Sm[CH(TMS)$_2$](THF), (PhO)$_2$Sm[CH$_2$(TMS)](THF), (PhO)$_2$Sm[TMS$_2$N](THF), (PhO)$_2$SmCl(THF), (PhO)$_2$SmH(THF), (PhO)$_2$SmMe(THF), (2,6-iPr$_2$C$_6$H$_3$O)$_2$Sm(THF)$_2$, (2,6-iPr$_2$C$_6$H$_3$O)$_2$Sm(THF)$_2$, (2,6-iPr$_2$C$_6$H$_3$O)$_2$Sm[CH(TMS)$_2$](THF), (2,6-iPr$_2$C$_6$H$_3$O)$_2$Sm[CH$_2$(TMS)](THF), (2,6-iPr$_2$C$_6$H$_3$O)$_2$Sm[TMS$_2$N](THF), (2,6-iPr$_2$C$_6$H$_3$O)$_2$SmCl(THF), (2,6-iPr$_2$C$_6$H$_3$O)$_2$SmH(THF), (2,6-iPr$_2$C$_6$H$_3$O)$_2$SmMe(THF), (BinO)Sm(THF)$_2$, (BinO)Sm[CH(TMS)$_2$](THF), (BinO)Sm[CH$_2$(TMS)](THF), (BinO)Sm[TMS$_2$N](THF), (BinO)SmCl(THF), (BinO)SmH(THF), (BinO)SmMe(THF), tbmpSm(THF)$_2$, tbmpSm[CH(TMS)$_2$](THF), tbmpSm[CH$_2$(TMS)](THF), tbmpSm[TMS$_2$N](THF), tbmpSmCl(THF), tbmpSmH(THF), tbmpSmMe(THF). In the foregoing formulae, Sm represents samarium; H, hydrogen; Cl, chlorine; Si, silicon; THF, tetrahydrofuran (hereinafter referred to as THF); TMS, trimethylsilyl; Me, methyl; iPr, isopropyl; tBu, tert-butyl; Ph, phenyl; BinN, 1,1'-binaphthalene-2,2'-diamide; BipN, 1,1'-biphenylene-2,2'-diamide; DmBipN, 3,3-dimethyl-1,1'-biphenylene-2,2'-diamide; PldN, 1,2-phenylenediamide; DmBlpN, 4,5-dimethyl-1,2-phenylenediamide; NldN, 2,3-napththalenediamide; Cp, cyclopentadienyl; Me$_4$Cp, 1,2,3,4-tetramethylcyclopentadienyl; Cp*, pentamethylcyclopentadienyl; ind, indenyl; Bprd, 2,2'-bipyridine; tpp, triphenylphosphine; dppp, 1,3-bis(diphenylphosphine)propane; BinO, 1,1-bi-2,2'-naphthol; and ttbmp, 2,2'-thiobis(6-tert-butylcresolate).

Alternatively, in the above-enumerated organosamarium complexes, the coordination number of THF which is an electron-donating ligand represented by Q in the general formula [1] may be 0 or in the range of 1 to 4. Moreover, the polymerization catalysts of the present invention also include organosamarium complexes derived from the above-enumerated organosamarium complexes by replacing THF with another electron-donating ligand such as diethyl ether, trimethylphosphine, pyridine or triethylamine, as well as organosamarium complexes having any desired combination of such electron-donating ligands. Furthermore, the polymerization catalysts of the present invention also include organosamarium complexes derived from the above-enumerated organosamarium complexes by using bromine or iodine in place of the chlorine used as a halogen atom represented by Q. Furthermore, the polymerization catalysts of the present invention also include organic transition metal complexes derived from the above-enumerated organosamarium complexes by replacing samarium (Sm) with a group III transition metal selected from scandium (Sc), yttrium (Y), lanthanide series elements (La to Lu) and actinide series elements (Ac to Lr).

As to the polar groups contained in the unsaturated monomers which can be polymerized according to the present invention with the aid of the polymerization catalysts for unsaturated monomers represented by the general formula [1], their polarity may vary widely. Specifically, the present invention can be applied to unsaturated monomers having functional groups ranging from amide and cyano groups having very high polarity, to an ester group having medium polarity, and further to aromatic hydrocarbon radicals having low polarity.

In the case of unsaturated monomers having active hydrogen, particularly unsaturated monomers having an active hydrogen atom on a polar group (e.g., an amide group or a methyl ketone group) and permitting this hydrogen to be migrated to the vinyl group during polymerization, their polymerization proceeds in the form of hydrogen migration polymerization (or transition polymerization) owing to the polymerization characteristics of the polymerization catalyst of the general formula [1]. This yields polymers having a structure characteristic of transition polymerization, such as polymers having, in the main chain, an amide linkage formed by the migration of the active hydrogen of an amide group to the double bond of the unsaturated monomer or a ketone group formed by the migration of the active hydrogen of methyl in a methyl ketone group to the double bond. On the other hand, in the case of unsaturated monomers having a polar group free of such an active hydrogen atom (e.g., an ester, ether, cyano, acetyl or phenyl group), their polymerization proceeds in the form of vinyl addition polymerization, resulting in the formation of vinyl polymers.

Examples of the unsaturated monomers containing such a polar group and hence having active hydrogen are as follows. Vinyl monomers containing an amide group as the polar group include acrylamides of 3 to 20 carbon atoms, and their α- or β-substituted derivatives and α,β-disubstituted derivatives. Specific examples thereof include crotonamide, methacrylamide, tiglamide, α-phenylacrylamide, β-phenylacrylamide, α-benzylacrylamide, β-benzylacrylamide and β-methylmethacrylamide. The aforesaid vinyl monomers also include N-substituted derivatives of acrylamides of 4 to 20 carbon atoms, and their α- or β-substituted derivatives and α,β-disubstituted derivatives. Specific examples thereof include N-methylacrylamide, N-isopropylacrylamide, N-tert-butylacrylamide, N-phenylacrylamide, N-methylcrotonamide, N-isopropylcrotonamide, N-tert-butylcrotonamide, N-phenylcrotonamide, N-methylmethacrylamide, N-isopropylmethacrylamide, N-tert-butylmethacrylamide, N-phenylmethacrylamide, N-methyltiglamide, N-isopropyltiglamide, N-tert-butyltiglamide, N-phenyltiglamide, N-methyl-α-phenylacrylamide, N-isopropyl-α-phenylacrylamide, N-tert-butyl-α-phenylacrylamide, N-phenyl-α-phenylacrylamide, N-methyl-β-phenylacrylamide, N-isopropyl-β-phenylacrylamide, N-tert-butyl-β-phenylacrylamide, N-phenyl-β-phenylacrylamide, N-methyl-β-methylmethacrylamide, N-isopropyl-β-methylmethacrylamide, N-tert-butyl-β-methylmethacrylamide and N-phenyl-β-methylmethacrylamide.

Other unsaturated monomers containing a polar group and having active hydrogen include, for example, unsaturated monomers containing a ketone group as the polar group, such as methyl vinyl ketone and β-phenyl vinyl ketone; and unsaturated monomers containing a sulfonamide group as the polar group, such as ethylenesulfonamide and styrenesulfonamide.

It is to be understood that the unsaturated monomers having active hydrogen are not limited to the above-described unsaturated monomers. That is, unsaturated monomers containing a polar group in which an electron-attracting group (e.g., carbonyl, nitro, nitroso, sulfonyl, or halogenated alkyl containing fluorine or the like) is attached to the α-, β- or γ-position and hydrogen is present on a carbon, nitrogen, sulfonyl, phosphorus or oxygen atom may be used without limit, provided that the hydrogen is active hydrogen.

Unsaturated monomers containing a cyano group as the polar group include acrylonitriles of 3 to 20 carbon atoms, and their α- or β-substituted derivatives and α,β-disubstituted derivatives. Specific examples thereof include crotononitrile, methacrylonitrile, 2-pentenenitrile, 3-pentenenitrile, α-phenylacrylonitrile, α-benzylacrylonitrile; allyl cyanide; and 5-norbornene-2-carbonitrile and allyl cyanide.

Unsaturated monomers containing an ester group as the polar group include acrylic esters of 4 to 20 carbon atoms, and their α- or β-substituted derivatives and α-disubstituted derivatives. Specific examples thereof include esters derived from crotonic acid, methacrylic acid, tiglic acid, α-phenylacrylic acid, β-phenylacrylic acid, α-benzylacrylic acid, β-benzylacrylic acid and β-methylmethacrylic acid by combining them with an alkyl group of 1 to 20 carbon atoms, such as methyl, ethyl, propyl, isopropyl, 2-methylpropyl, tert-butyl or cyclohexyl; an aryl group of 6 to 20 carbon atoms, such as phenyl, benzyl or naphthyl; and a silicon-containing alkyl group of 1 to 20 carbon atoms or a silicon-containing aryl group of 6 to 20 carbon atoms, such as trimethylsilyl, dimethylsilyl, cyclohexyldimethylsilyl, tert-butyldimethylsilyl, dimethylphenylsilyl or trimethylsilylmethyl.

Unsaturated monomers containing an ether group as the polar group include unsaturated monomers of 3 to 20 carbon atoms containing an ether or epoxy group. Examples thereof include unsaturated monomers containing an ether group, such as methyl vinyl ether, allyl ethyl ether, butadiene monoxide and 1,2-epoxy-5-hexene; unsaturated monomers containing an acetyl group, such as vinyl acetate; unsaturated monomers containing a sulfonamide group, such as ethylenesulfonamide and styrenesulfonamide; and maleic anhydride and maleimide.

Moreover, cyclic esters such as butyrolactone and caprolactone can also be polymerized according to the present invention.

Unsaturated monomers containing an aromatic hydrocarbon radical include styrene, α-methylstyrene, vinylnaphthalene, p-methyl-α-methylstyrene, p-methoxystyrene, p-nitrostyrene. and the like. Other unsaturated monomers include olefins such as ethylene, propylene, butene, pentene, hexene, isoprene and 3-methylbutene-1; cyclic olefins such as norbornene, cyclopentene, cyclohexene, 5-cyanonorbornene and 5-methoxycarbonylnorbornene; and diene monomers such as butadiene.

These unsaturated monomers may be either homopolymerized or copolymerized in admixture of two or more.

The copolymer of the present invention which is formed by the copolymerization of unsaturated monomers including at least one unsaturated monomer having an amide group and have a polyamide linkage in the polymer chain is a copolymer obtained by a process in which unsaturated monomers including an unsaturated monomer selected from acrylamides of 3 to 20 carbon atoms and their $\alpha$- or $\beta$-substituted derivatives and $\alpha,\beta$-disubstituted derivatives are copolymerized with the aid of a polymerization catalyst represented by the general formula [1], so that a polyamide linkage is formed in the main polymer chain as a result of hydrogen transfer polymerization. In this process, the type of the polymerization reaction for forming the polyamide bonding and effecting the unsaturated monomer with comonomers may be a reaction proceeding in the form of hydrogen transfer polymerization alone, a reaction proceeding in the form of a combination of hydrogen migration polymerization and vinyl addition polymerization, or a reaction proceeding in the form of a combination of hydrogen transfer polymerization and other transition polymerization. The unsaturated monomers used as comonomers may be not only other unsaturated monomers having an amide group, but also any desired unsaturated monomers other than the aforesaid unsaturated monomer having an amide group. Particularly preferred examples thereof include unsaturated monomers containing a polar group such as an ester group (e.g., methyl acrylate), a cyano group (e.g., acrylonitrile), a ketone group (e.g., vinyl methyl ketone) or a sulfonamide group (e.g., ethylenesulfonamide), as well as maleic anhydride and maleimide. Moreover, unsaturated monomers containing an aromatic hydrocarbon radical (e.g., styrene), olefins (e.g., ethylene), cyclic olefins (e.g., norbornene) and diene monomers (e.g., butadiene) may also be used in combination.

In the copolymer of the present invention which has a polyamide linkage, the content of the unsaturated monomer containing an amide group is in the range of 99.1 to 0.1% by weight and preferably 99.0 to 1.0% by weight. The molecular weight of the copolymer having a polyamide linkage is such that its specific viscosity ($\eta_{sp}/c$) as measured in formic acid at 35° C. (c is measured at a polymer concentration of 0.1 g/dl in formic acid) is in the range of 3.000 to 0.01 dl/g and preferably 2.00 to 0.05 dl/g, and its weight-average molecular weight as measured by GPC analysis using a solvent comprising dimethylformamide (DMF) containing 0.01 mol/l of lithium bromide at 40° C. is in the range of 8,000,000 to 1,000 and preferably 5,000,000 to 5,000.

In the present invention, the polymerization catalysts of the general formula [1] are used in such an amount that the molar ratio of the polymerization catalyst to the unsaturated monomer(s) is in the range of 1 to 1/10,000 and preferably not greater than 1/10. Moreover, during polymerization, a small amount of an organoaluminum compound may also be used in combination. Useful organoaluminum compounds include trimethylaluminum, triethylaluminum, tripropylaluminum, triisopropylaluminum, tri-n-butylaluminum, triisobutylaluminum, tri-sec-butylaluminum, dimethylaluminum chloride, diethylaluminum chloride, dipropylaluminum chloride, diisopropylaluminum chloride, di-n-butylaluminum chloride, diisobutylaluminum chloride, di-sec-butylaluminum chloride, methylaluminoxane and the like.

These organoaluminum compounds are preferably used in combination with the polymerization catalysts of the general formula [1] in which Q is halogen, and are useful as alkylating agents for the alkylation of halogen. These organoaluminum compounds are used in an amount of 0.01 to 10,000 moles, preferably 1 to 10 moles, per mole of the polymerization catalyst. If the amount used is greater than 10,000 moles, the polar group(s) of the unsaturated monomer(s) having a polar group may undergo a side reaction and interfere with the polymerization. On the other hand, if the amount use is less than 0.01 mole, sufficient alkylation will not occur. Where an organoaluminum compound is used, it may be brought into contact with the polymerization catalyst prior to polymerization. Alternatively, the polymerization catalyst and the organoaluminum compound may be brought into contact with each other by adding them separately to the unsaturated monomer (s).

In the present invention, the polymerization of an unsaturated monomer or unsaturated monomers may be carried out according to any of various techniques including solution polymerization in which the unsaturated monomer or monomers are dissolved in any desired solvent medium and polymerized, bulk polymerization in which the liquid unsaturated monomer or monomers themselves are used as a liquid medium, and vapor phase polymerization in which the unsaturated monomer or monomers are polymerized in their vapor phase or a gaseous medium comprising an inter gas. The solvents which can be used in solution polymerization include ethers such as tetrahydrofuran, dioxane and dimethoxyethane; aliphatic hydrocarbons such as hexane, heptane and octane; aromatic hydrocarbons such as benzene, toluene and xylene; sulfoxides such as dimethyl sulfoxide; amides such as dimethylformamide and dimethylacetamide; and the like. In bulk polymerization in which the liquid unsaturated monomer or monomers themselves are used as a liquid medium, the unsaturated monomers which are in a liquid state at atmospheric pressure or increased pressures may be used as a liquid medium. In vapor phase polymerization, the unsaturated monomers which are in a gaseous state at temperature or under heating may be used. Moreover, any inert gas may be used, provided that it does not undergo polymerization.

The polymerization of an unsaturated monomer or monomers in the present invention is usually carried out at a polymerization temperature of −150 to 200° C. and preferably −20 to 150° C. Although no particular limitation is placed on the polymerization pressure, it preferably ranges from atmospheric pressure to 10 MPa.

EXAMPLES

The present invention is further illustrated by the following examples. However, these examples are not to be construed to limit the scope of the invention.

Properties of the polymers obtained in these examples were measured according to the following procedures. Average molecular weights were determined by GPC. Specifically, each of the polymers formed from unsaturated monomers was dissolved in DMF, and subjected to GPC using 830-RI and UVIDEC-100-VI detectors (manufactured by Jasco Corp.) and a Shodex KD-806M column. The flow rate of the solvent comprising DMF containing 0.01 mol/l of lithium bromide was 0.8 ml/min at 40° C., and molecular weights were calibrated with polystyrene standards. For purposes of NMR analysis, NMR spectra were recorded with JEOL-EX400 or 270 by reference to TMS or residual protons of the solvent. Elemental analyses were made by measuring and calculating carbon, hydrogen and nitrogen contents with a PE2400II CHN analyzer (manufactured by Perkin-Elmer Inc.). For infrared absorption spectral analysis, infrared absorption spectra were recorded with a Shimadzu FTIR-8100M infrared spectrophotometer.

Example 1
[Synthesis of Polymerization Catalysts]
(1) Synthesis of Catalyst A: [((CH$_3$)$_3$Si)$_2$N]$_2$Sm(OC$_4$H$_8$)$_2$ Under an atmosphere of nitrogen, 20 ml of a THF solution of sodium bis(trimethylsilyl)amide (20 mmol) was added dropwise to 100 ml of a stirred THF solution of divalent samarium iodide (10 mmol) at room temperature, and the resulting mixture was stirred for 6 hours. The solvent was distilled off from this solution to obtain a purple solid. This solid was extracted with pentane, and the resulting white precipitate was filtered off on a glass filter. After the filtrate was concentrated and cooled at −30° C. overnight, the precipitated crystals were separated by filtration and dried in vacuo to obtain 5.4 g of a deep-purple solid.

Elemental analysis—Calcd.: C, 39.04%; H, 8.52%; N, 4.55%. Found: C, 38.62%; H, 8.43%; N, 4.59%. $^1$H-NMR spectrum (400 MHz, C$_6$D$_6$): δ4.42(12H), −0.46(6H).

(2) Synthesis of Catalyst B: [((CH$_3$)$_2$C)$_2$N]$_2$Sm(OC$_4$H$_8$)$_2$

Under an atmosphere of nitrogen, 2 ml of a THF solution of potassium bis(isopropyl)amide (2 mmol) was added dropwise to 10 ml of a stirred THF solution of divalent samarium iodide (1 mmol) at room temperature, and the resulting mixture was stirred for 6 hours. The solvent was distilled off from this solution to obtain a yellow solid. This solid was extracted with pentane, and the resulting white precipitate was filtered off on a glass filter. After the filtrate was concentrated, the precipitated solid was washed with cold pentane and dried in vacuo to obtain 0.43 g of a deep-yellow solid.

Elemental analysis—Calcd.: C, 48.53%; H, 8.96%; N, 4.66%. Found: C, 48.13%; H, 8.90%; N, 5.77%.

(3) Synthesis of Catalyst C: [(2,6-iPrC$_6$H$_3$((CH$_3$)$_3$Si)N]$_2$-Sm(OC$_4$H$_8$)$_2$ Under an atmosphere of nitrogen, a solid form of potassium N-trimethylsilyl-2,6-isopropylphenylamide (2 mmol) was slowly added to 10 ml of a stirred THF solution of divalent samarium iodide (1 mmol) at −30° C., and the resulting mixture was stirred at room temperature for 8 hours. The solvent was distilled off from this solution to obtain a deep-green solid. This solid was extracted with pentane, and the resulting white precipitate was filtered off on a glass filter. After the pentane was distilled off from the filtrate, the residue was recrystallized from diethyl ether at −30° C. The resulting solid was separated by filtration, washed with cold diethyl ether, and dried in vacuo to obtain 0.42 g of a deep-green solid.

Elemental analysis—Calcd.: C, 57.66%; H, 8.66%; N, 3.54%. Found: C, 57.03%; H, 8.20%; N, 3.89%.

Example 2

Figure 2:
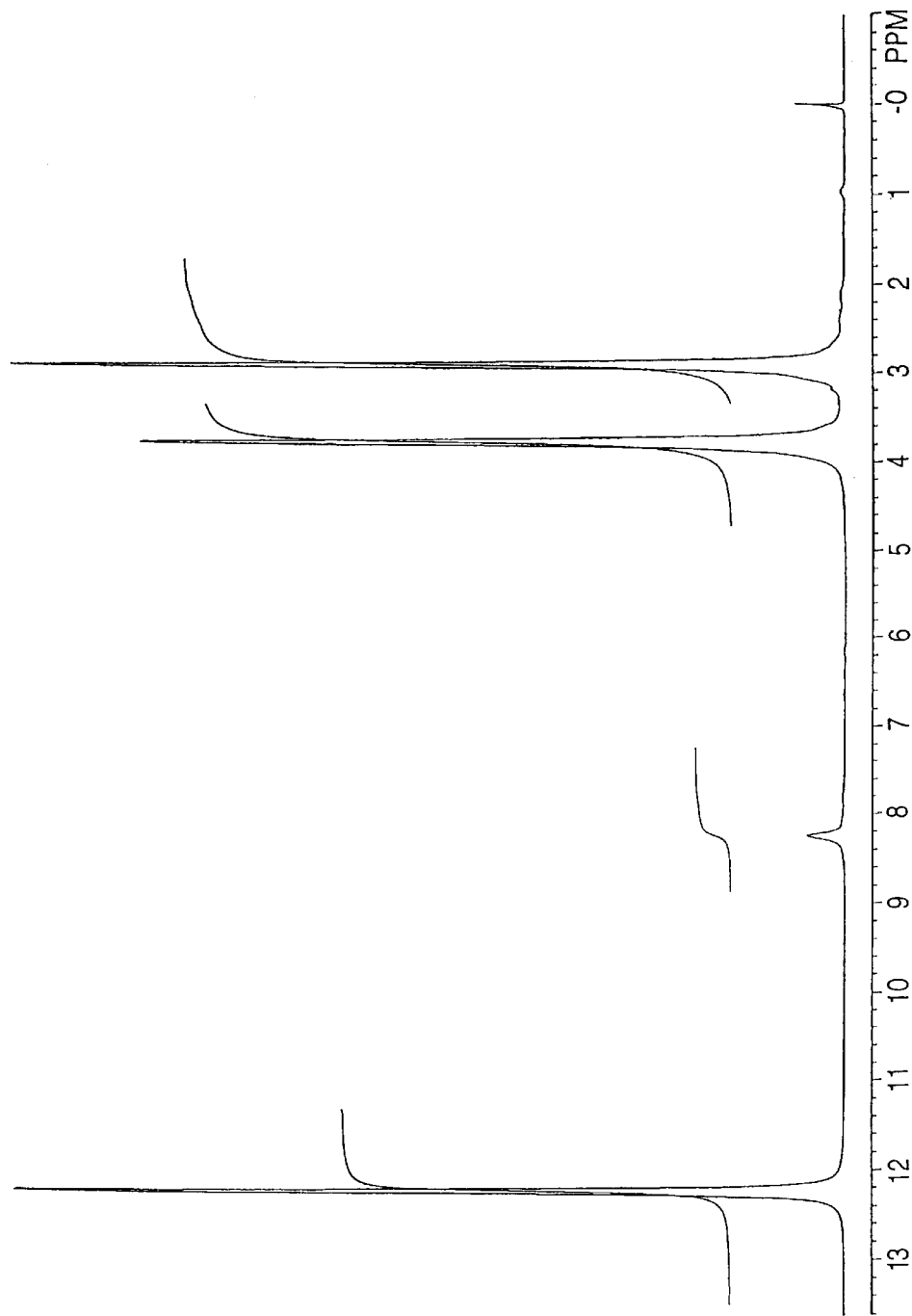
FIG. 2 shows the $^1$H-NMR spectrum (with deuterated trifluoroacetic acid as the solvent) of a hot water-insoluble fraction of a polymer obtained in Example 2.

After the air in a 50 ml Schlenk flask was fully replaced with nitrogen, 100 mg of acrylamide and 10 ml of toluene were placed therein. A toluene solution containing 10 mg of catalyst A obtained in Example 1 was added thereto, and the monomer was polymerized at 110° C. for 2 hours. After the polymerization was stopped by the addition of 0.5 ml of methanol, acetone was added. The suspended polymer was separated by filtration, washed thoroughly with hydrochloric acid/methanol and methanol, and then dried under reduced pressure at 80° C. for 6 hours. The yield of the polymer thus obtained was 98 mg, its specific viscosity ($\eta_{sp}/c$) as measured in formic acid at 35° C. was 0.504 dl/g (c was measured at a polymer concentration of 0.1 g/dl in formic acid), and its melting point (Tm) as measured by DSC was 321° C. On the basis of the results of NMR spectral analysis, this polymer was poly-β-alanine (FIG. 2).

Example 3

After the air in a 50 ml Schlenk flask was fully replaced with nitrogen, 300 mg of methyl methacrylate and 5 ml of toluene were placed therein. A toluene solution containing 8 mg of catalyst A obtained in Example 1 was added thereto, and the monomer was polymerized at 80° C. for 2 hours. After the polymerization was stopped by the addition of 0.5 ml of methanol, the reaction mixture was added to hydrochloric acid/methanol. The precipitated polymer was separated by filtration, washed thoroughly with methanol, and then dried under reduced pressure at 80° C. for 6 hours. The yield of the polymer thus obtained was 253 mg, its weight-average molecular weight (Mw) based on polystyrene standards was 13,000, and its molecular weight distribution (Mw/Mn) was 1.51. The glass transition point (Tg) of the polymer as measured by DSC was 93° C.

Example 4

Acrylamide was polymerized in the same manner as in Example 2, except that 15 mg of catalyst B was used in place of 10 mg of catalyst A. The yield of the polymer thus obtained was 85 mg, its n sp/c was 0.275 dl/g, and its Tm was 314° C. On the basis of the results of NMR analysis, this polymer was poly-β-alanine.

Example 5

Acrylamide was polymerized in the same manner as in Example 2, except that 15 mg of catalyst C was used in place of 10 mg of catalyst A. The yield of the polymer thus obtained was 95 mg, its $\eta_{sp}/c$ was 0.490 dl/g, and its Tm was 325° C. On the basis of the results of NMR analysis, this polymer was poly-β-alanine.

Example 6

Figure 3:
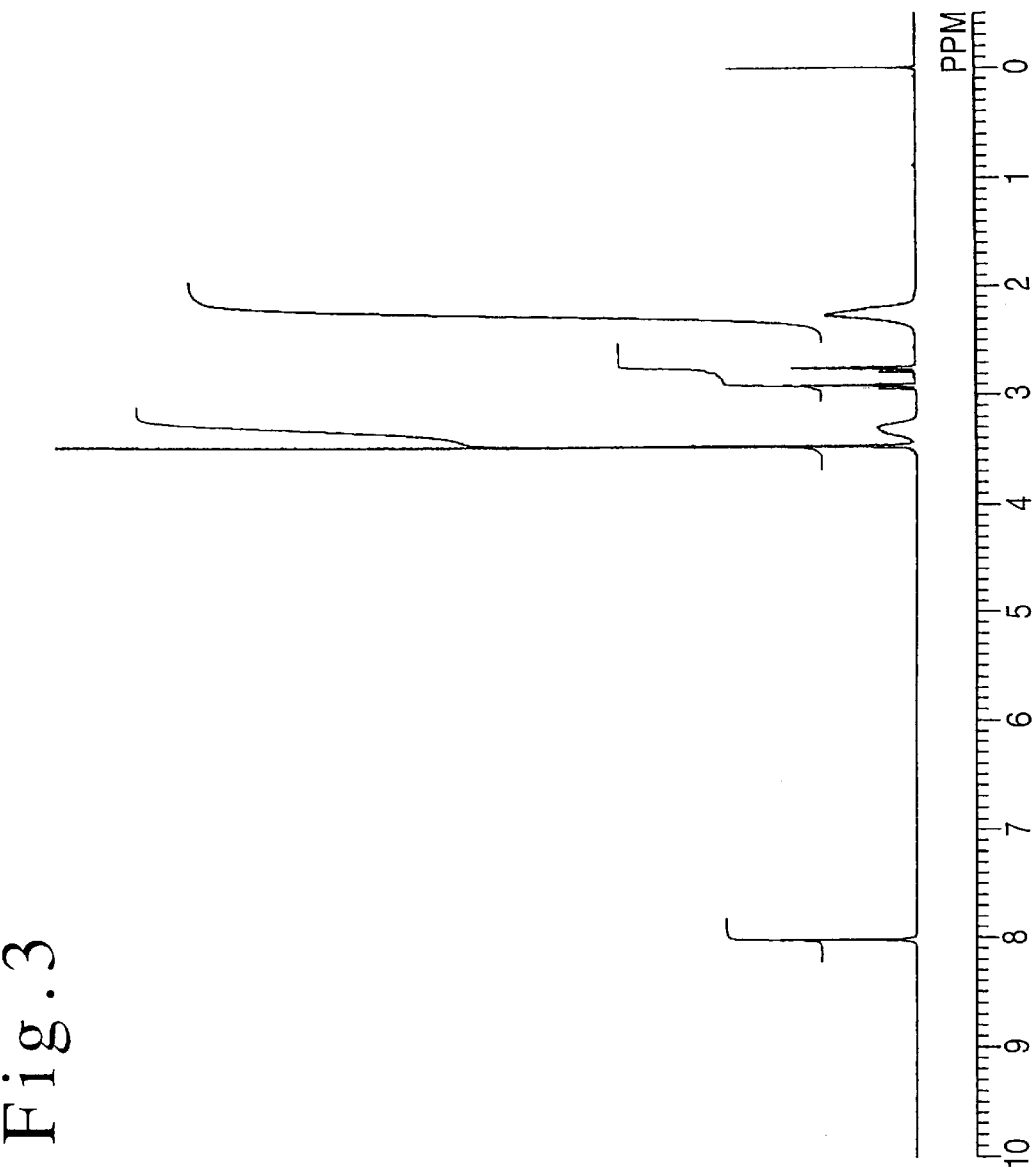
FIG. 3 shows the $^1$H-NMR spectrum (with deuterated DMF as the solvent) of a polymer obtained in Example 6.

Under an atmosphere of nitrogen, 6 g of acrylonitrile was placed in a 50 ml Schlenk flask. While this monomer was being stirred at a polymerization temperature of 40° C., a toluene solution containing 5 mg of catalyst A obtained in Example 1 was added thereto, and the monomer was polymerized for 1 hour. After the polymerization was stopped by the addition of 0.5 ml of methanol, the polymer suspended in methanol was separated by filtration, washed thoroughly with hydrochloric acid/methanol and methanol, and then dried under reduced pressure at 80° C. for 6 hours. The yield of the polymer thus obtained was 0.7 g. Its weight-average molecular weight (Mw) as measured by GPC was 2,000,000, and its Mw/Mn was 2.24. (Its NMR spectrum is shown FIG. 3.)

Example 7

Acrylonitrile was polymerized in the same manner as in Example 6, except that the polymerization temperature was changed to 80° C. The yield of the polymer thus obtained was 1.3 g, its weight-average molecular weight (Mw) was 700,000, and its Mw/Mn was 2.85.

Example 8

Figure 4:
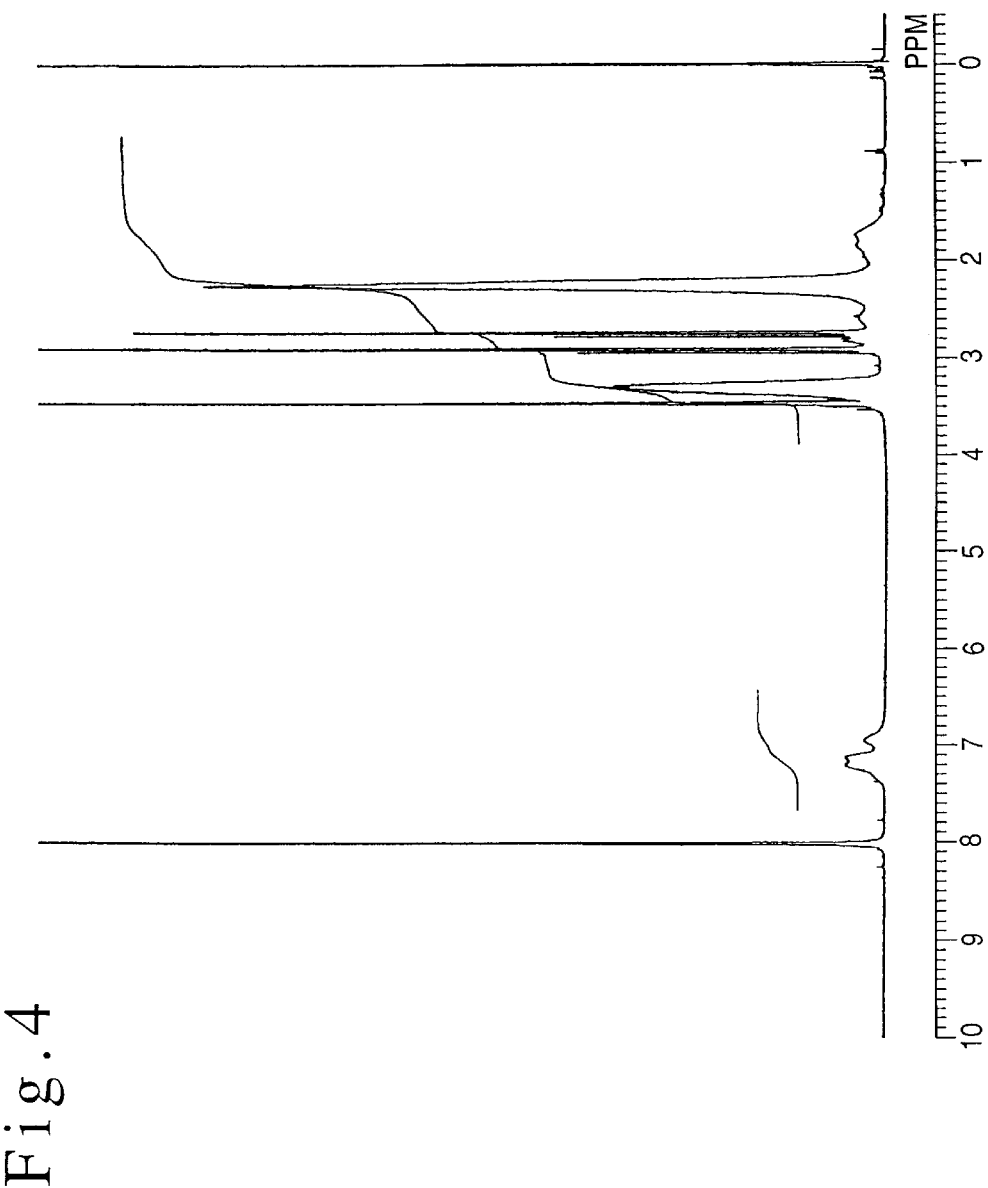
FIG. 4 shows the $^1$H-NMR spectrum (with deuterated DMF as the solvent) of a polymer obtained in Example 8.
Figure 5:
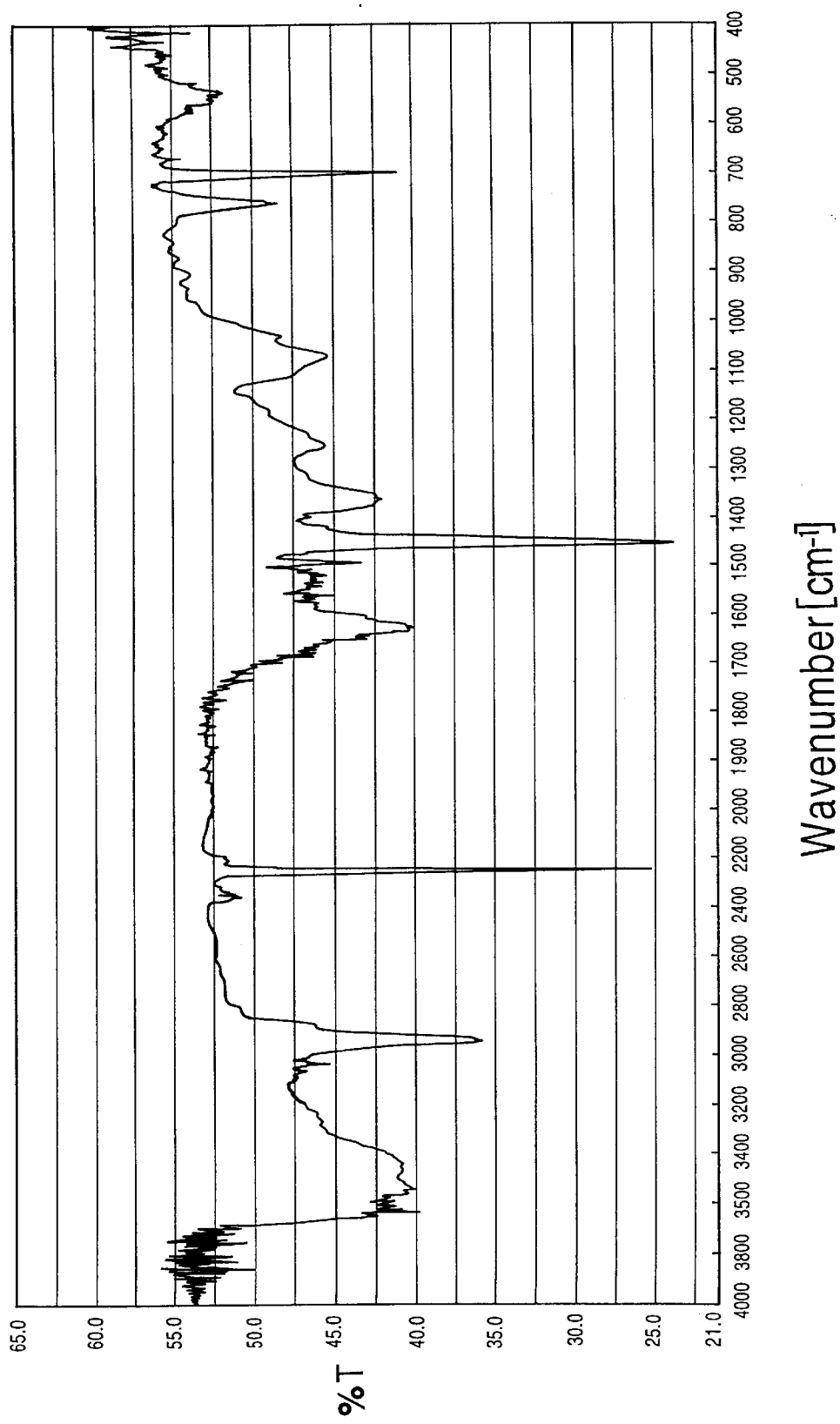
FIG. 5 shows the IR spectrum of the polymer obtained in Example 8.

Under an atmosphere of nitrogen, 2 g of acrylonitrile and 4 g of styrene were placed in a 50 ml Schlenk flask. While these monomers were being stirred at a polymerization temperature of 40° C., a toluene solution containing 5 mg of the deep-purple solid obtained in Example 1 was added thereto, and the monomers were polymerized for 1 hour. After the polymerization was stopped by the addition of 0.5 ml of methanol, the polymer suspended in methanol was separated by filtration, washed thoroughly with hydrochloric acid/methanol and methanol, and then dried under reduced pressure at 80° C. for 6 hours. The polymer thus obtained was extracted with chloroform to obtain 0.3 g of a chloroform-insoluble polymer. On the basis of its NMR spectrum (FIG. 4) and IR spectrum (FIG. 5), this polymer had a styrene content of 7%. Its weight-average molecular weight (Mw) as measured by GPC was 300,000, and its Mw/Mn was 3.62.

Example 9

Figure 6:
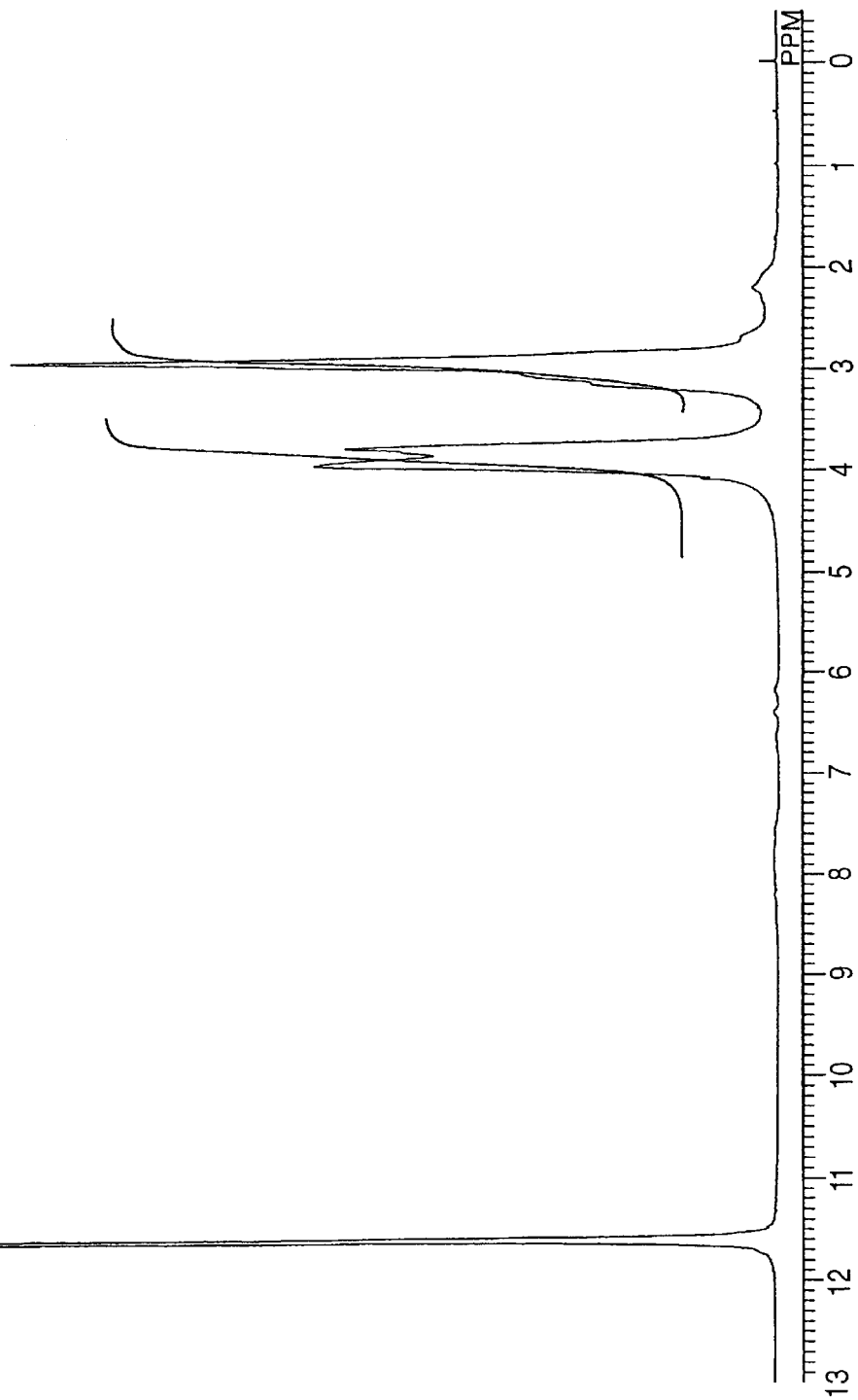
FIG. 6 shows the $^1$H-NMR spectrum (with deuterated trifluoroacetic acid as the solvent) of a polymer obtained in Example 9.
Figure 7:
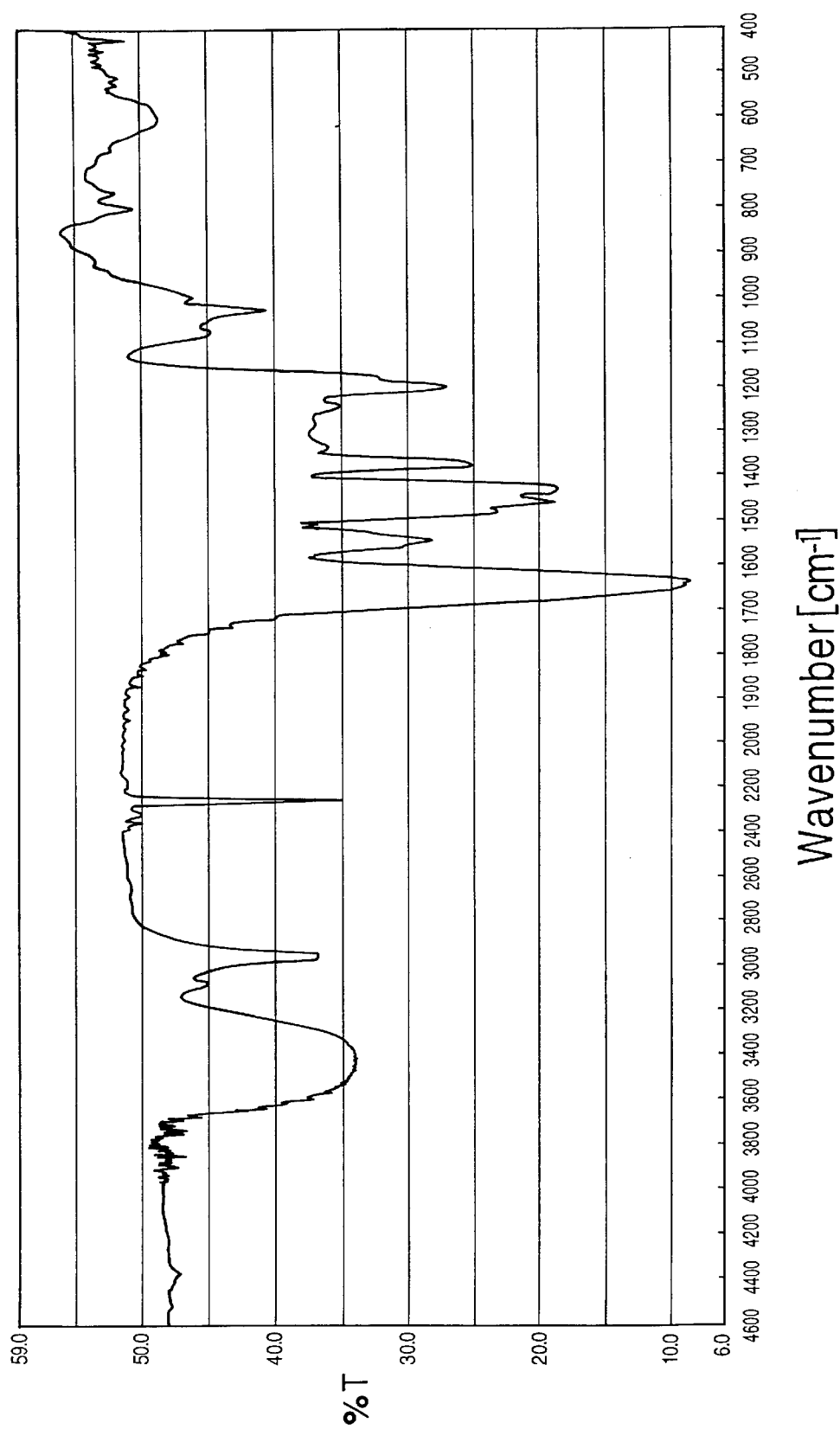
FIG. 7 shows the IR spectrum of the polymer obtained in Example 9.

After the air in a 50 ml Schlenk flask was fully replaced with nitrogen, 1.05 g of acrylamide, 0.75 g of acrylonitrile, and 30 ml of toluene were placed therein. A toluene solution containing 50 mg of catalyst A was added thereto, and the monomers were polymerized at 110° C. for 1 hour. After the polymerization was stopped by the addition of 0.5 ml of methanol, acetone was added. The suspended polymer was separated by filtration, washed thoroughly with hydrochloric acid/methanol, methanol and hot water, and then dried under reduced pressure at 80° C. for 6 hours. The yield of the polymer thus obtained was 0.480 g. On the basis of its H-NMR spectrum (FIG. 6), its IR spectrum (FIG. 7), and chemical shifts in its $C^{13}$-NMR spectrum (amide CO: 179.6, 177.4, 174.2 ppm and CN: 129.1, 128.4 ppm), this polymer was a β-alanine-acrylonitrile copolymer having an acrylonitrile content of 9%. Its weight-average molecular weight (Mw) as measured by GPC was 16,000, and its Mw/Mn was 1.65. The Tm of this polymer as measured by DSC was 300° C.

Example 10
[Synthesis of Polymerization Catalysts]
(1) Synthesis of Catalyst D: [1,3-(2,6-iPr$_2$C$_6$H$_3$N)$_2$C$_3$H$_6$]Y-[CH$_2$(TMS)]

Under an atmosphere of nitrogen, 2.1 equivalents of an n-hexane solution of n-BuLi was added dropwise to 300 ml of a THF solution of N,N'-di(2,6-diisopropylphenyl)-propylene-1,3-diamine [1,3-(2,6-iPr$_2$C$_6$H$_3$NH)$_2$C$_3$H$_6$] (7.9 g) at 0° C. After the resulting mixture was stirred at room temperature overnight, the solvent was distilled off. The resulting white solid was washed with pentane and then dried under reduced pressure to obtain 10.9 g of the 1,3-(2,6-iPr$_2$C$_6$H$_3$N)$_2$C$_3$H$_6$-dilithium.2THF compound. A suspension of yttrium trichloride (586 mg, 3.0 mmol) in 20 ml of THF was heated at 55° C. for 30 minutes, and a THF solution of dilithium (1.65 g, 3.0 mmol) was added dropwise thereto at 0° C. The resulting mixture was stirred for 2 hours and then stirred at room temperature overnight. The solvent was distilled off from this solution to obtain a pale-yellow oily residue. This residue was extracted with pentane, and the insoluble matter was filtered off. After the filtrate was concentrated and cooled at −30° C., the precipitated solid was separated by filtration and dried in vacuo under heated conditions to obtain 1.0 g of a pale-yellow solid. Subsequently, a pentane solution containing 2.0 mmol of trimethylsilylmethyllithium was added to 20 ml of a toluene solution of the white solid at 0° C., and the resulting solution was stirred for 3 hours. After the solution was filtered, the filtrate was concentrated under reduced pressure, and the residue was extracted with pentane and filtered. The filtrate was concentrated under reduced pressure and recrystallized from pentane at −30° C. to obtain 0.9 g of a pale-yellow solid. $^1$H-NMR spectrum (270 MHz, C$_6$D$_6$): δ7.25–6.90 (6H), 3.38(4H), 3.00(4H), 1.45(2H), 1.23(24H), 0.29(9H), −0.18(2H).

(2) Synthesis of Catalyst E: [N,N'-(TMS)$_2$-PldN]Y[CH$_2$(TMS)]

Under an atmosphere of nitrogen, a toluene (130 ml) solution of 1,2-phenylenediamine (10 g, 92.5 mmol) and triethylamine (22 g, 220 mmol) was heated to 120° C., and trimethylsilyl chloride (20 g, 180 mmol) was added dropwise thereto. The resulting mixture was heated for 1 hour, and the salt so formed was filtered off. After the solvent was removed from the filtrate, the residue was distilled under reduced pressure to obtain 18.6 g of a pale-yellow liquid (120–121° C./6 mmHg, 80% yield). $^1$H-NMR spectrum (270 MHz, CDCl$_3$): δ6.93(2H), 6.88(2H), 0.16(18H).

Under an atmosphere of nitrogen, 2 equivalents of an n-hexane solution of n-BuLi was added dropwise to 300 ml of a THF solution of the above liquid (18.6 g) at −78° C. After the resulting mixture was stirred at room temperature overnight, the solvent was distilled off under reduced pressure. The resulting white solid was washed with pentane and then dried under reduced pressure to obtain 18.6 g (97% yield) of the N,N'-(TMS)$_2$-PldN-dilithium compound. The white powder thus obtained (5 g, 19 mmol) and yttrium trichloride (3.7 g, 18.9 mmol) were dissolved in 150 ml of THF, and the resulting solution was stirred at room temperature overnight. After the solution was filtered, the filtrate was concentrated under reduced pressure. The residue was washed with ether and then with pentane, and dried under reduced pressure to obtain 6.78 g of a white powdery complex. $^1$H-NMR spectrum (270 MHz, C$_6$D$_6$): δ7.35(2H, bs), 7.03(2H), 0.81(18H). Subsequently, an ether solution containing 6.4 mmol of trimethylsilylmethymagnesium chloride was added to 50 ml of a THF solution containing 2.0 g (5.3 mmol) of the white powdery complex, and the resulting solution was stirred at room temperature overnight. After the solution was filtered, the filtrate was concentrated under reduced pressure. The residue was washed with ether and then with pentane, dried under reduced pressure, recrystallized from hexane/THF at −30° C., separated by filtration, and dried in vacuo to obtain 1.0 g of a white solid. $^1$H-NMR spectrum (270 MHz, C$_6$D$_6$): δ7.26(2H), 6.78(2H), 0.96(2H), 0.69(12H), 0.46(9H), 0.42(6H).

(3) Synthesis of Catalyst F: [N,N'-(TMS)$_2$-PldN]Sm(TMS)$_2$ 7.6 ml of a THF solution of divalent samarium iodide (7.6 mmol) was added to the white powdery N,N'-(TMS)$_2$-PldN-dilithium compound (2.0 g, 7.6 mmol) synthesized in the above-described manner, and the resulting mixture was stirred at room temperature overnight. After the solvent was removed from the solution, the residue was extracted with methylene chloride and then with toluene, precipitated from pentane, and dried in vacuo to obtain 0.5 g of brown solid. $^1$H-NMR spectrum (270 MHz, C$_6$D$_6$): δ7.71(2H), 6.93(2H), 0.15(18H).

(4) Synthesis of Catalyst G: [N,N'-(TMS)$_2$-BinN]Y-[CH$_2$(TMS)](THF)

Under an atmosphere of nitrogen, 2 equivalents of an n-hexane solution of n-BuLi was added dropwise to 300 ml of a THF solution of N,N'-di(trimethylsilyl)-1,1'-binaphthalene-2,2-diamine [N,N'-(TMS)$_2$-BinNH] (10 g, 23.3 mmol) at −78° C. After the resulting mixture was stirred at room temperature overnight, the solvent was distilled off under reduced pressure. The resulting white solid was washed with pentane and then dried under reduced pressure to obtain 9.9 g of the N,N'-(TMS)$_2$-BinN-dilithium compound. The white powder thus obtained (4.9 g, 11.1 mmol) and yttrium trichloride (2.1 g, 10.7 mmol) were dissolved in 150 ml of THF, and the resulting solution was stirred at room temperature overnight. After the solution was filtered, the filtrate was concentrated under reduced pressure. The residue was washed with ether and then with pentane, and dried under reduced pressure to obtain 6.0 g of a white powdery complex. Subsequently, an ether solution containing 3.5 mmol of trimethylsilylmethymagnesium chloride was added to 50 ml of a THF solution containing 2.0 g (3.2 mmol) of the white powdery complex, and the resulting solution was stirred at room temperature overnight. After the solution was filtered, the filtrate was concentrated under reduced pressure. The residue was washed with ether and then with pentane, dried under reduced pressure, recrystallized from hexane/THF at −78° C., separated by filtration, and dried in vacuo to obtain 0.67 g of a white solid. $^1$H-NMR spectrum (270 MHz, $C_6D_6$): δ8.1–6.8(12H), 1.32(2H), 0.70(12H), 0.39 (6H), 0.15(9H).

Example 11

Under an atmosphere of nitrogen, 6 g of acrylonitrile was placed in a 20 ml flask. While this monomer was being stirred at a polymerization temperature of 25° C., a THF solution containing 6 mg of catalyst D obtained in Example 10 was added thereto, and the monomer was polymerized for 2 hours. After the polymerization was stopped by the addition of 0.5 ml of methanol, the polymer suspended in methanol was separated by filtration, washed thoroughly with hydrochloric acid/methanol and methanol, and then dried under reduced pressure at 80° C. for 6 hours. The yield of the polymer thus obtained was 1.50 g. Its weight-average molecular weight (Mw) as measured by GPC was 3,100,000, and its Mw/Mn was 2.12.

Example 12

Acrylonitrile was polymerized in the same manner as in Example 11, except that 5 mg of polymerization catalyst E was used in place of 6 mg of polymerization catalyst D. The yield of the polymer thus obtained was 1.4 g, its weight-average molecular weight (Mw) was 2,300,000, and its Mw/Mn was 2.35.

Example 13

Acrylonitrile was polymerized in the same manner as in Example 11, except that 5 mg of polymerization catalyst F was used in place of 6 mg of polymerization catalyst D. The yield of the polymer thus obtained was 0.9 g, its weight-average molecular weight (Mw) was 2,500,000, and its Mw/Mn was 2.20.

Example 14

Acrylonitrile was polymerized in the same manner as in Example 11, except that 6 mg of polymerization catalyst G was used in place of 6 mg of polymerization catalyst D. The yield of the polymer thus obtained was 0.7 g, its weight-average molecular weight (Mw) was 1,800,000, and its Mw/Mn was 2.56.

Example 15

After the air in a 50 ml Schlenk flask was fully replaced with nitrogen, 100 mg of acrylamide and 10 ml of toluene were placed therein. A toluene solution containing 10 mg of catalyst D obtained in Example 10 was added thereto, and the monomer was polymerized at 110° C. for 2 hours. After the polymerization was stopped by the addition of 0.5 ml of methanol, acetone was added. The suspended polymer was separated by filtration, washed thoroughly with hydrochloric acid/methanol and methanol, and then dried under reduced pressure at 80° C. for 6 hours. The yield of the polymer thus obtained was 89 mg, its specific viscosity ($\eta_{sp}/c$) as measured in formic acid at 35° C. was 0.46 dl/g (c was measured at a polymer concentration of 0.1 g/dl in formic acid), and its melting point (Tm) as measured by DSC was 304° C. On the basis of the results of NMR spectral analysis, this polymer was poly-β-alanine.

Example 16

Acrylamide was polymerized in the same manner as in Example 15, except that 10 mg of polymerization catalyst E was used in place of 10 mg of polymerization catalyst D. The yield of the polymer thus obtained was 100 mg, its specific viscosity ($\eta_{sp}/c$) as measured in formic acid at 35° C. was 0.38 dl/g, and its melting point (Tm) as measured by DSC was 289° C. On the basis of the results of NMR spectral analysis, this polymer was poly-β-alanine.

Example 17

Acrylamide was polymerized in the same manner as in Example 15, except that 10 mg of polymerization catalyst F was used in place of 10 mg of polymerization catalyst D. The yield of the polymer thus obtained was 97 mg, its specific viscosity ($\eta_{sp}/c$) as measured in formic acid at 35° C. was 0.51 dl/g, and its melting point (Tm) as measured by DSC was 317° C. On the basis of the results of NMR spectral analysis, this polymer was poly-β-alanine.

Example 18

Acrylamide was polymerized in the same manner as in Example 15, except that 10 mg of polymerization catalyst G was used in place of 10 mg of polymerization catalyst D. The yield of the polymer thus obtained was 88 mg, its specific viscosity ($\eta_{sp}/c$) as measured in formic acid at 35° C. was 0.402 dl/g, and its melting point (Tm) as measured by DSC was 306° C. On the basis of the results of NMR spectral analysis, this polymer was poly-β-alanine.

Example 19

Acrylamide was polymerized in the same manner as in Example 15, except that 10 mg of polymerization catalyst H was used in place of 10 mg of polymerization catalyst D. The yield of the polymer thus obtained was 45 mg, its specific viscosity ($\eta_{sp}/c$) as measured in formic acid at 35° C. was 0.138 dl/g, and its melting point (Tm) as measured by DSC was 289° C. On the basis of the results of NMR spectral analysis, this polymer was poly-β-alanine.

Example 20

Acrylamide was polymerized in the same manner as in Example 15, except that 10 mg of polymerization catalyst I was used in place of 10 mg of polymerization catalyst D. The yield of the polymer thus obtained was 57 mg, its specific viscosity ($\eta_{sp}/c$) as measured in formic acid at 35° C. was 0.154 dl/g, and its melting point (Tm) as measured by DSC was 293° C. On the basis of the results of NMR spectral analysis, this polymer was poly-β-alanine.

The processes of the present invention make it possible to produce polymers from a wide variety of unsaturated monomers ranging from unsaturated monomers containing a functional group with high polarity to unsaturated monomers containing a functional group with low polarity, and hence have great value from an industrial point of view.

What is claimed is:

1. A transition metal compound represented by the following general formula [1]:

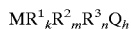

wherein $R^1$ is selected from the group consisting of ligands having at least one nitrogen, sulfur, phosphorus or oxygen atom; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands; when two or more ligands are represented by each of these symbols, they may be the same or different; k is an integer of 1 to 4; and m, n and h are each 0 or an integer of 1 to 4, the compound being characterized in that $R^1$ is a ligand represented by any of the following general formula [2], [3] and [4]:

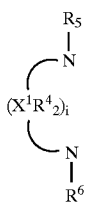

wherein $R^4$ is selected from the group consisting of a hydrogen atom, alkyl groups and aryl groups; $R^5$ and $R^6$ are each selected from the group consisting of alkyl groups, aryl groups, silicon-containing alkyl groups and silicon-containing aryl groups; $X^1$ is selected from the group consisting of a carbon atom and silicon atom, where $X^1$ may be the same or different if $X^1$ is more than one and i is an integer of 1 to 6;

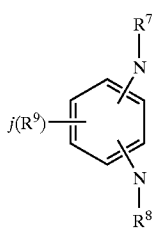

wherein $R^7$, $R^8$ and $R^9$ are each selected from the group consisting of alkyl groups, aryl groups, silicon-containing alkyl groups and silicon-containing aryl groups, where $R^7$, $R^8$ and $R^9$ may be the same or different if j is more than one; and j is 0 or an integer of 1 to 4;

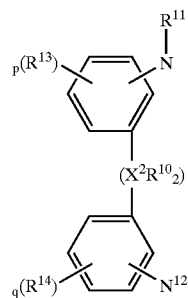

wherein $R^{10}$ is selected from the group consisting of a hydrogen atom, alkyl groups and aryl groups; $R^{11}$, $R^{12}$, $R^{13}$ and $R^{14}$ are each selected from the group consisting of alkyl groups, aryl groups, silicon-containing alkyl groups and silicon-containing aryl groups; $X^2$ is selected from the group consisting of a carbon atom and a silicon atom, $X^2$ may be the same or different if 1, p and q is more than one; and 1, p and q are each 0 or an integer of 1 to 4.

2. A polymerization catalyst for unsaturated monomers which comprises a compound as claimed in claim 1.

3. A polymerization process comprising the step of effecting the homopolymerization or copolymerization of one or more unsaturated monomers by using a polymerization catalyst as claimed in claim 2.

4. A polymerization process comprising the step of effecting the homopolymerization of an unsaturated monomer having a cyano group, or the copolymerization of unsaturated monomers including at least one unsaturated monomer having a cyano group, with the aid of a polymerization catalyst which comprises a transition metal compound represented by the following general formula [1]:

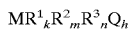

wherein $R^1$ is selected from the group consisting of ligands having at least one nitrogen, sulfur, phosphorus or oxygen atom; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands; when two or more ligands are represented by each of these symbols, they may be the same or different; k is an integer of 1 to 4; m is 0; and n and h are each 0 or an integer of 1 to 4, the compound being characterized in that $R^1$ is a ligand represented by any of the following general formula [2], [3] and [4]:

wherein $R^4$ is selected from the group consisting of a hydrogen atom, alkyl groups and aryl groups; $R^5$ and $R^6$ are each selected from the group consisting of alkyl groups, aryl groups, silicon-containing alkyl groups and silicon-containing aryl groups; $X^1$ is selected from the group consisting of a carbon atom and silicon atom, where $X^1$ may be the same or different if $X^1$ is more than one and i is an integer of 1 to 6;

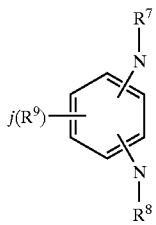
[3]

wherein $R^7$, $R^8$ and $R^9$ are each selected from the group consisting of alkyl groups, aryl groups, silicon-containing alkyl groups and silicon-containing aryl groups, where $R^7$, $R^8$ and $R^9$ may be the same or different if j is more than one; and j is 0 or an integer of 1 to 4;

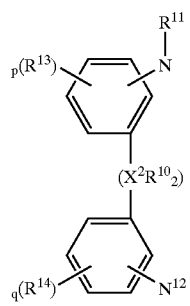
[4]

wherein $R^{10}$ is selected from the group consisting of a hydrogen atom, alkyl groups and aryl groups; $R^{11}$, $R^{12}$, $R^{13}$ and $R^{14}$ are each selected from the group consisting of alkyl groups, aryl groups, silicon-containing alkyl groups and silicon-containing aryl groups; $X^2$ is selected from the group consisting of a carbon atom and a silicon atom, $X^2$ may be the same or different if 1, p and q is more than one; and 1, p and q are each 0 or an integer of 1 to 4.

5. A polymerization process comprising the step of effecting the homopolymerization of an unsaturated monomer having an amide group, or the copolymerization of unsaturated monomers including at least one unsaturated monomer having an amide group, with by using a polymerization catalyst which comprises a transition metal compound represented by the following general formula [1]:

$$MR^1{}_k R^2{}_m R^3{}_n Q_h \qquad [1]$$

wherein $R^1$ is selected from the group consisting of ligands having at least one nitrogen, sulfur, phosphorus or oxygen atom; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands; when two or more ligands are represented by each of these symbols, they may be the same or different; k is an integer of 1 to 4; m, n and h are each 0 or an integer of 1 to 4, the compound being characterized in that $R^1$ is a ligand represented by any of the following general formula [2], [3] and [4]:

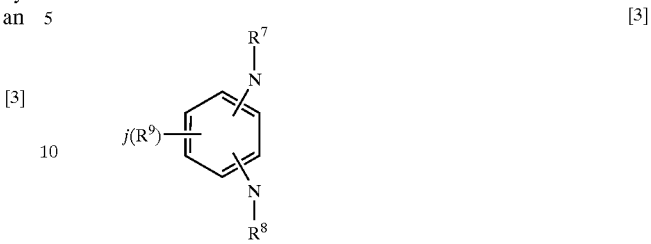
[3]

wherein $R^4$ is selected from the group consisting of a hydrogen atom, alkyl groups and aryl groups; $R^5$ and $R^6$ are each selected from the group consisting of alkyl groups, aryl groups, silicon-containing alkyl groups and silicon-containing aryl groups; $X^1$ is selected from the group consisting of a carbon atom and silicon atom, where $X^1$ may be the same or different if $X^1$ is more than one and i is an integer of 1 to 6;

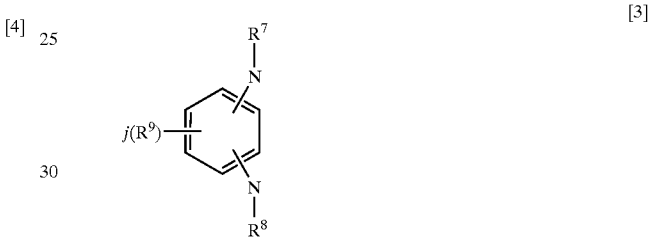
[3]

wherein $R^7$, $R^8$ and $R^9$ are each selected from the group consisting of alkyl groups, aryl groups, silicon-containing alkyl groups and silicon-containing aryl groups, where $R^7$, $R^8$ and $R^9$ may be the same or different if j is more than one; and j is 0 or an integer of 1 to 4;

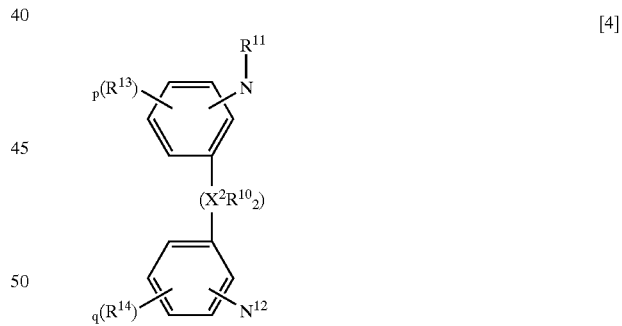
[4]

wherein $R^{10}$ is selected from the group consisting of a hydrogen atom, alkyl groups and aryl groups; $R^{11}$, $R^{12}$, $R^{13}$ and $R^{14}$ are each selected from the group consisting of alkyl groups, aryl groups, silicon-containing alkyl groups and silicon-containing aryl groups; $X^2$ is selected from the group consisting of a carbon atom and a silicon atom, $X^2$ may be the same or different if 1, p and q is more than one; and 1, p and q are each 0 or an integer of 1 to 4.

6. A copolymer formed by the copolymerization of unsaturated monomers including at least one unsaturated monomer having active hydrogen, the copolymer being characterized by having a linkage formed by the migration of the active hydrogen of the unsaturated monomer.

7. A copolymer as claimed in claim 6 which is formed by the copolymerization of unsaturated monomers including at least one unsaturated monomer having an amide group and which has a polyamide bonding in the polymer chain.

8. A polymerization process as claimed in claim 5 wherein there is used a polymerization catalyst of the general formula [1] in which $R^1$ is N-trimethylsilyl-2,6-diisopropylphenylamide, bis(trimethylsilyl)amide or bis(isopropyl)amide, k is 2, m and n are each 0, M is samarium, Q is tetrahydrofuran, and h is 1 or 2.

9. A polymerization process comprising the step of effecting the hompolymerization or copolymerization of one or more unsaturated monomers by using a polymerization catalyst which comprises a transition metal compound represented by the following general formula [1]:

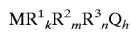

$$MR^1{}_k R^2{}_m R^3{}_n Q_h \quad [1]$$

wherein $R^1$ is N,N'-di(2,6-diisopropylphenyl)-propylene-1-diamide or N,N'-di(trimethlsilyl)-1,2-phenylenediamide; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands; when two or more ligands are represented by each of these symbols, they may be the same or different; k is an integer of 1 to 4; m, n and h are each 0 or an integer of 1 to 4, the compound being characterized in that $R^1$ is a ligand represented by any of the following general formula [2], [3] and [4]:

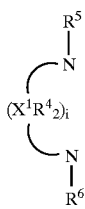

[2]

wherein $R^4$ is selected from the group consisting of a hydrogen atom, alkyl groups and aryl groups; $R^5$ and $R^6$ are each selected from the group consisting of alkyl groups, aryl groups, silicon-containing alkyl groups and silicon-containing aryl groups; $X^1$ is selected from the group consisting of a carbon atom and silicon atom, where $X^1$ may be the same or different if $X^1$ is more than one and i is an integer of 1 to 6;

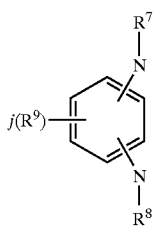

[3]

wherein $R^7$, $R^8$ and $R^9$ are each selected from the group consisting of alkyl groups, aryl groups, silicon-containing alkyl groups and silicon-containing aryl groups, where $R^7$, $R^8$ and $R^9$ may be the same or different if j is more than one; and j is 0 or an integer of 1 to 4;

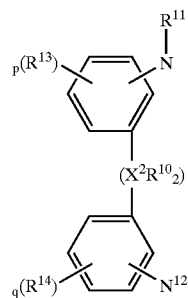

[4]

wherein $R^{10}$ is selected from the group consisting of a hydrogen atom, alkyl groups and aryl groups; $R^{11}$, $R^{12}$, $R^{13}$ and $R^{14}$ are each selected from the group consisting of alkyl groups, aryl groups, silicon-containing alkyl groups and silicon-containing aryl groups; $X^2$ is selected from the group consisting of a carbon atom and a silicon atom, $X^2$ may be the same or different if 1, p and q is more than one; and 1, p and q are each 0 or an integer of 1 to 4.

10. A polymerization process as claimed in claim 4 wherein there is used a polymerization catalyst of the general formula [1] in which $R^1$ is N-trimethylsilyl-2,6-diisopropylphenylamide, bis(trimethylsilyl)amide or bis(isopropyl)amide, k is 2, m and n are each 0, M is samarium, Q is tetrahydrofuran, and h is 1 or 2.

11. A polymerization process comprising the step of effecting the homopolymerization of an unsaturated monomer having a cyano group, or the copolymerization of unsaturated monomers including at least one unsaturated monomer having a cyano group, with the aid of a polymerization catalyst which is represented by the following general formula [1]:

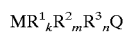

$$MR^1{}_k R^2{}_m R^3{}_n Q \quad [1]$$

wherein $R^1$ is selected from the group consisting of ligands having at least one nitrogen, sulfur, phosphorus or oxygen atom; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands, where Q may be the same or different if h is more than one; k is an integer of 1 to 4; m is 0; and n and h are each 0 or an integer of 1 to 4.

12. A polymerization process as claimed in claim 11 wherein there is used a polymerization catalyst of the general formula [1] in which $R^1$ is N-trimethylsilyl-2,6-diisopropylphenylamide, bis(trimethylsilyl)amide or bis(isopropyl)amide, k is 2, m and n are each 0, M is samarium, Q is tetrahydrofuran, and h is 1 or 2.

13. A polymerization process comprising the step of effecting the homopolymerization of an unsaturated monomer having an amide group, or the copolymerization of unsaturated monomers including at least one unsaturated monomer having an amide group, with by using a polymerization catalyst which is represented by the following general formula [1]:

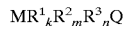

$$MR^1{}_k R^2{}_m R^3{}_n Q \quad [1]$$

wherein $R^1$ is selected from the group consisting of ligands having at least one nitrogen, sulfur, phosphorus or oxygen atom; $R^2$ is a ligand comprising cyclic hydrocarbons having π-electrons, and $R^1$ and $R^2$ may be crosslinked with each other; $R^3$ is selected from the group consisting of ligands comprising a hydrogen atom, alkyl groups, aryl groups, silicon-containing alkyl groups and silicon-containing aryl groups; M is a metal selected from scandium, yttrium, lanthanide series transition metals and actinide series transition metals; Q is selected from the group consisting of halogen atoms and electron-donating ligands, where Q may be the same or different if h is more than one; k is an integer of 1 to 4; m, n and h are each 0 or an integer of 1 to 4.

14. A polymerization process as claimed in claim 13 wherein there is used a polymerization catalyst of the general formula [1] in which $R^1$ is N-trimethylsilyl-2,6-diisopropylphenylamide, bis(trimethylsilyl)amide or bis(isopropyl)amide, k is 2, m and n are each 0, M is samarium, Q is tetrahydrofuran, and h is 1 or 2.

* * * * *

UNITED STATES PATENT AND TRADEMARK OFFICE
CERTIFICATE OF CORRECTION

PATENT NO. : 6,703,459 B1  Page 1 of 1
DATED : March 9, 2004
INVENTOR(S) : Tadahiro Sunaga et al.

It is certified that error appears in the above-identified patent and that said Letters Patent is hereby corrected as shown below:

Title page,
Insert Item -- [73] Assignee: Mitsui Chemicals, Inc., Tokyo (JP) --

Signed and Sealed this

Twenty-seventh Day of July, 2004

JON W. DUDAS
*Acting Director of the United States Patent and Trademark Office*